(12) United States Patent
Hashi et al.

(10) Patent No.: US 7,220,323 B2
(45) Date of Patent: May 22, 2007

(54) CLEANING METHOD FOR MAGNETIC TRANSFER CARRIER

(75) Inventors: Hideyuki Hashi, Kadoma (JP); Keizo Miyata, Kadoma (JP); Taizou Hamada, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 30 days.

(21) Appl. No.: 10/362,071

(22) PCT Filed: Jun. 19, 2002

(86) PCT No.: PCT/JP02/06095

§ 371 (c)(1),
(2), (4) Date: Feb. 20, 2003

(87) PCT Pub. No.: WO03/001526

PCT Pub. Date: Jan. 3, 2003

(65) Prior Publication Data

US 2003/0172956 A1 Sep. 18, 2003

(30) Foreign Application Priority Data

Jun. 20, 2001 (JP) ............................. 2001-186271
Aug. 3, 2001 (JP) ............................. 2001-236882

(51) Int. Cl.
*B08B 7/04* (2006.01)

(52) U.S. Cl. ............................ 134/6; 134/32; 134/33; 15/77; 15/88.2

(58) Field of Classification Search ................... 134/6, 134/7, 33, 32; 15/77, 88.2, 102
See application file for complete search history.

(56) References Cited

U.S. PATENT DOCUMENTS

| | | | | |
|---|---|---|---|---|
| 4,935,981 A | * | 6/1990 | Ohtani et al. | ............... 15/88.2 |
| 5,590,009 A | * | 12/1996 | Ishida | ..................... 360/135 |
| 5,868,866 A | * | 2/1999 | Maekawa et al. | ............. 134/34 |
| 2002/0015245 A1 | | 2/2002 | Hamada et al. | |

FOREIGN PATENT DOCUMENTS

| | | |
|---|---|---|
| EP | 0 915 456 A | 5/1999 |
| EP | 1 187 108 A | 3/2002 |
| JP | 10-040544 A | 2/1998 |
| JP | 10040544 A | 2/1998 |
| JP | 2000-285637 A | 10/2000 |
| JP | 2002-109730 A | 4/2002 |
| WO | WO 00/65579 A | 11/2000 |
| WO | WO 00/65580 A | 11/2000 |

* cited by examiner

*Primary Examiner*—Michael Barr
*Assistant Examiner*—Saeed Chaudhry
(74) *Attorney, Agent, or Firm*—McDermott Will & Emery LLP

(57) ABSTRACT

A cleaning method preventing foreign matter attached to a brush from being transferred back to a magnetic transfer carrier by removing foreign matter attached to a cleaning tool such as the brush with a dummy carrier having a recess equivalent to that on a surface of the magnetic transfer carrier.

19 Claims, 16 Drawing Sheets

F I G. 1
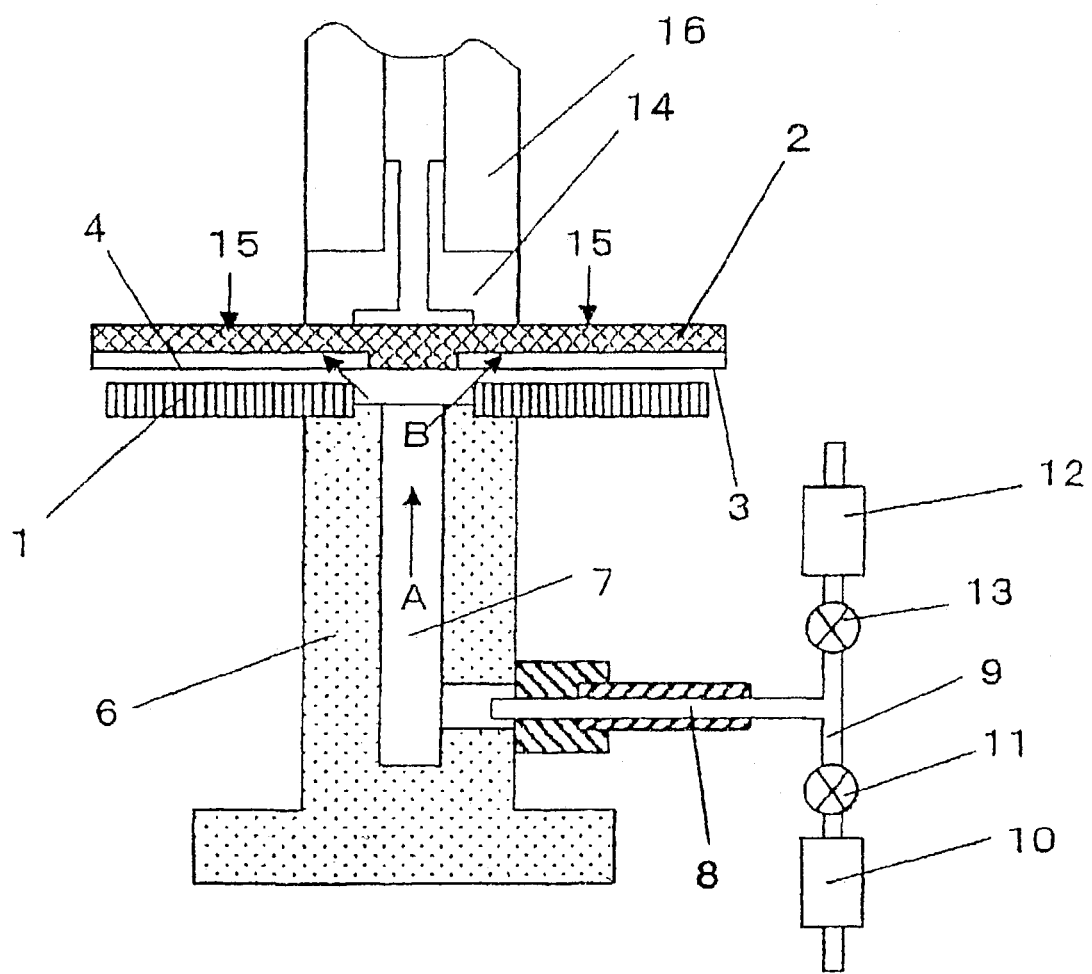

F I G. 3
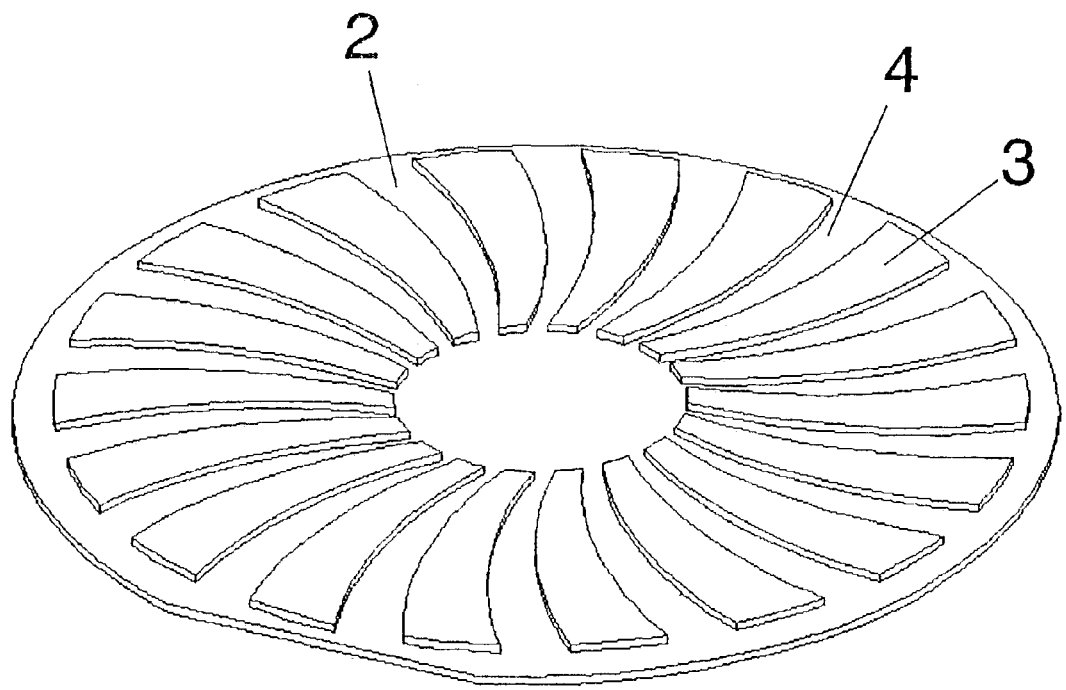

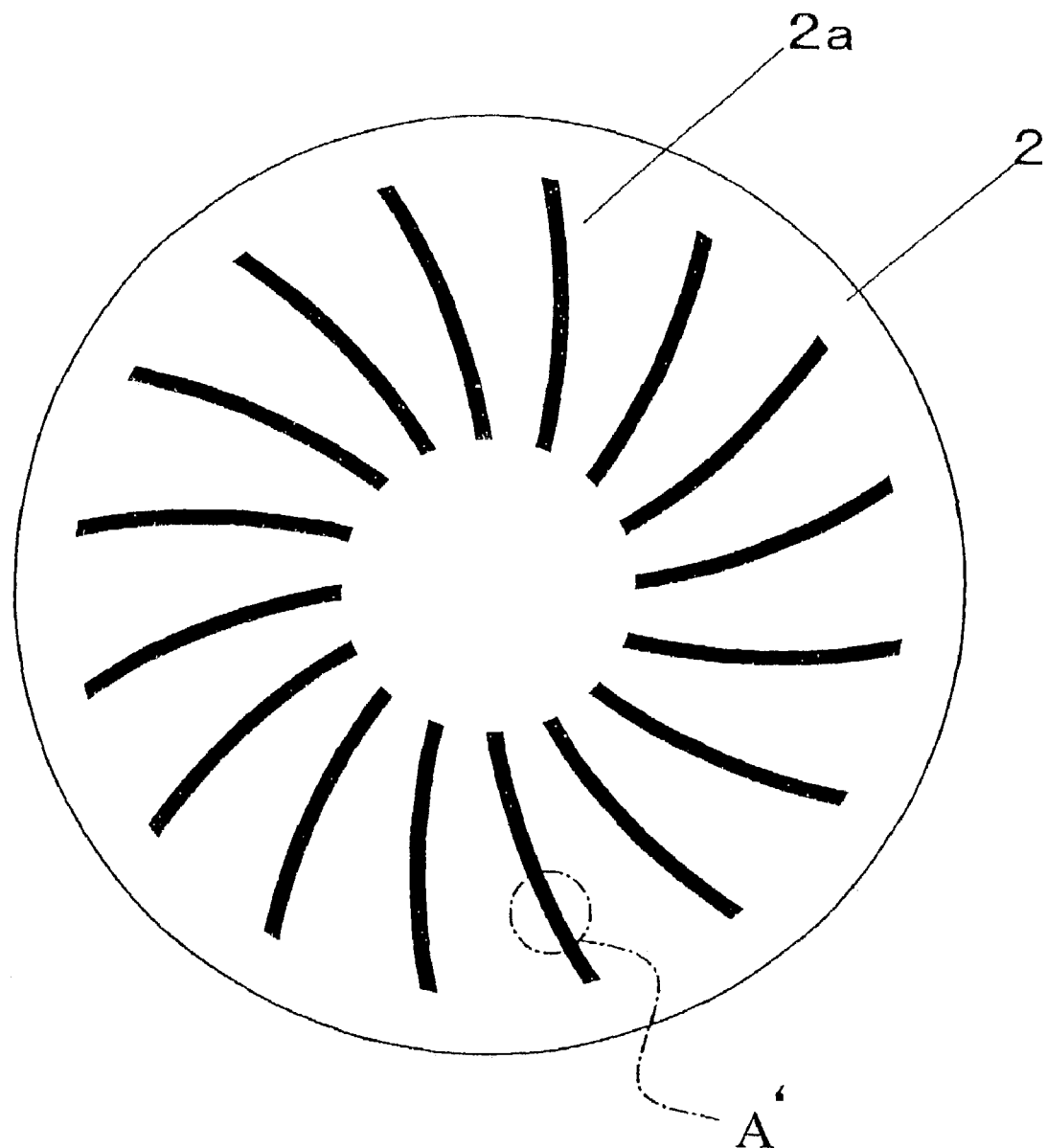
F I G. 5

F I G. 10
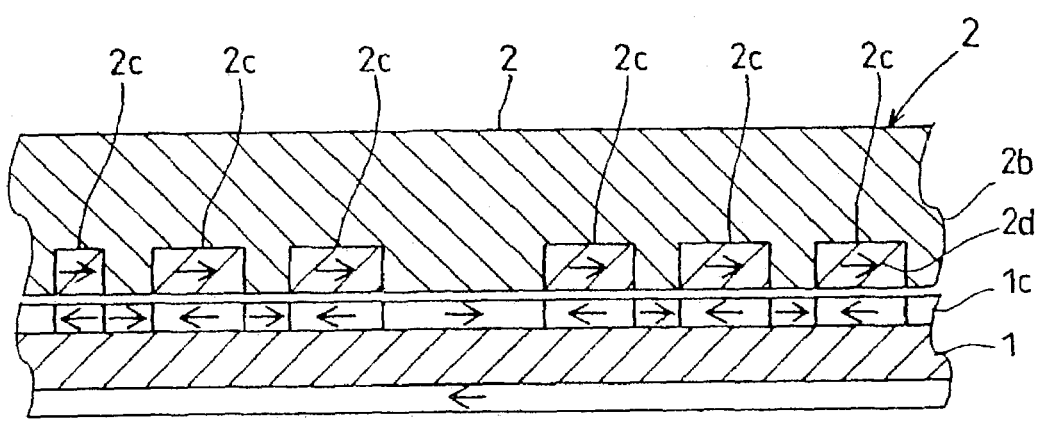

F I G. 11
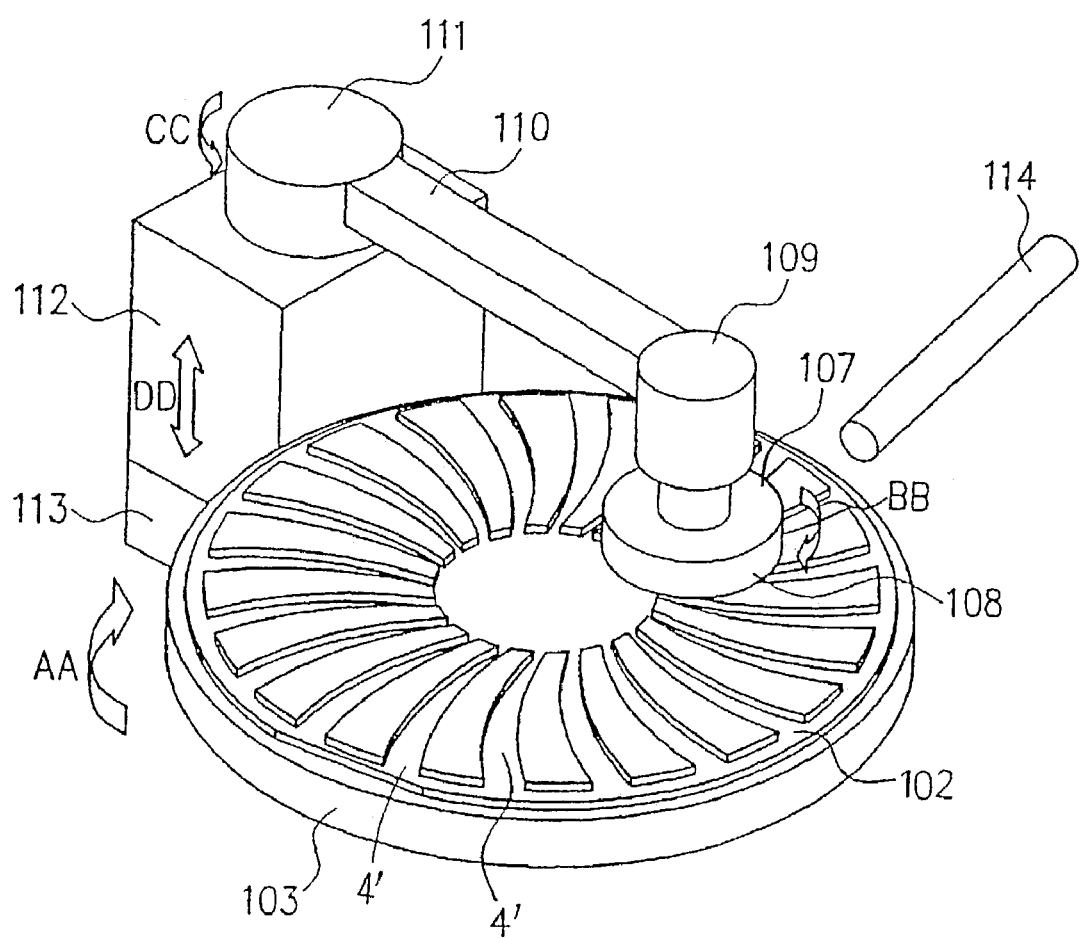

F I G. 12
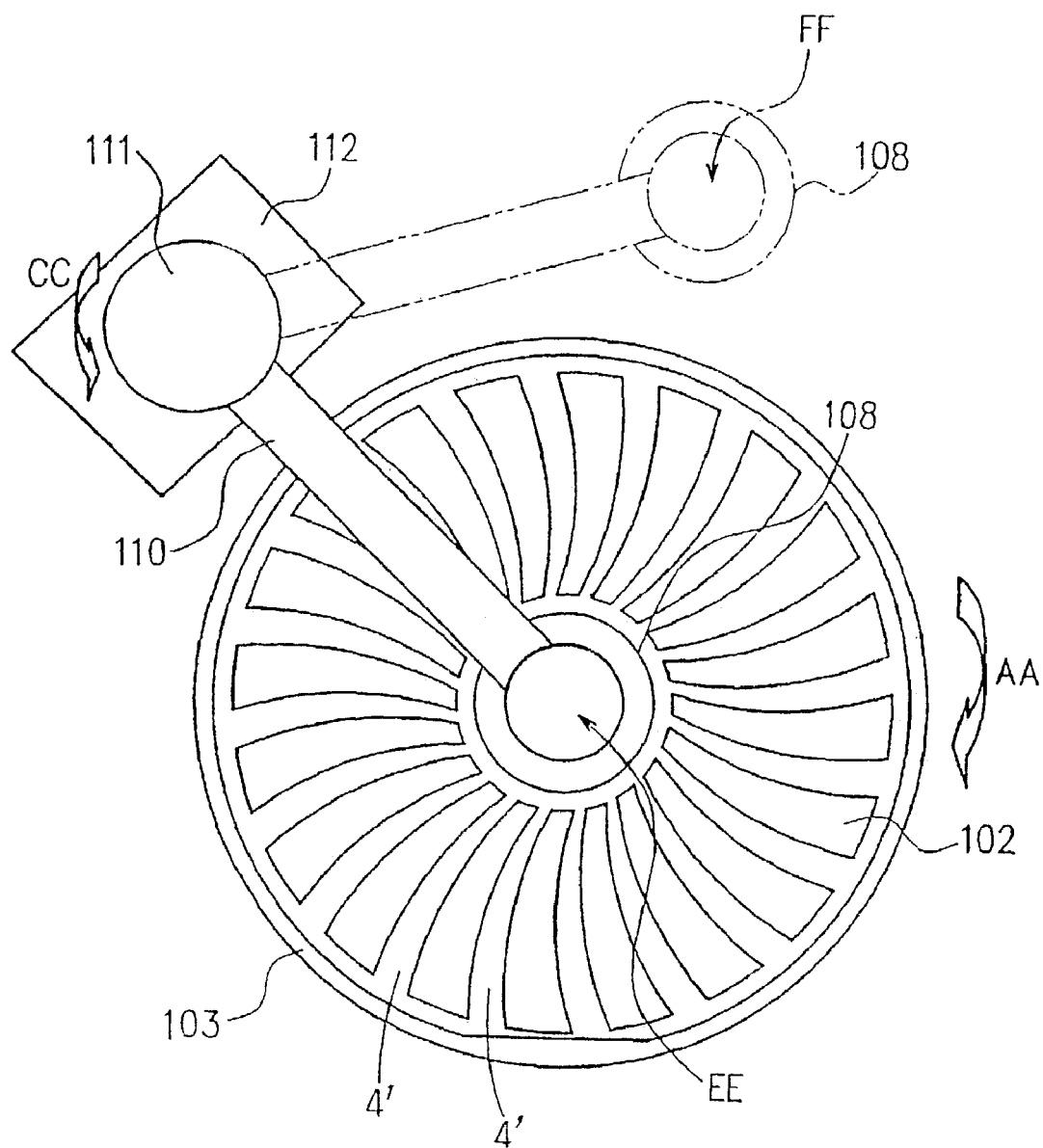

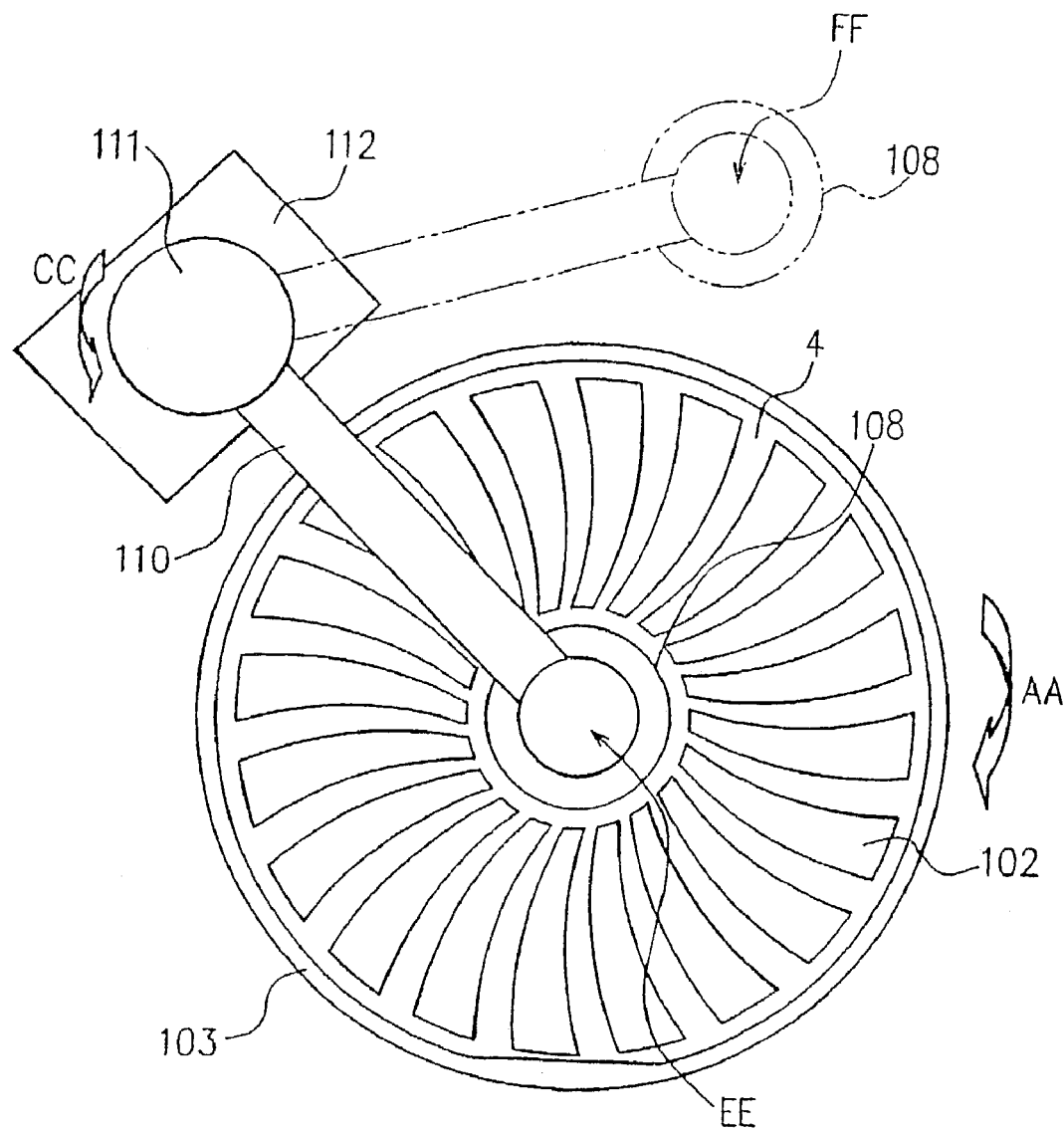
F I G. 15

CLEANING METHOD FOR MAGNETIC TRANSFER CARRIER

TECHNICAL FIELD

The present invention relates to a cleaning method for a magnetic transfer carrier on which an information signal is recorded, and more particularly to a cleaning method for a magnetic transfer carrier for performing magnetic transfer of the information signal to a magnetic record medium used in a hard disk device or a floppy disk device.

BACKGROUND ART

Information signals such as a tracking servo signal, an address information signal and a recovered clock signal are recorded on a magnetic transfer carrier. There has been known a magnetic transfer apparatus magnetically transferring information signals recorded on a magnetic transfer carrier onto a magnetic record medium such as a hard disk or a floppy disk. For example, a magnetic transfer carrier disclosed in Japanese Unexamined Patent Publication No. 10-40544 (1998) has magnetic portions made of ferromagnetic material in a pattern for information signals on a surface of a substrate. A magnetic record medium is a sheet or a disk with a ferromagnetic thin film or a ferromagnetic powder coat layer formed thereon. A surface of a magnetic transfer carrier is put into contact with a surface of a magnetic record medium in the shape of a disk and a prescribed magnetic field is applied. With this procedure, information signals formed on the magnetic transfer carrier are magnetically transferred onto the magnetic record medium. It is important that information signals with a high density are uniformly transferred stably across all of the surface of the magnetic record medium in order to reproduce records with high precision with a magnetic head of a magnetic record reproducing apparatus. On this occasion in magnetic transfer, if tiny foreign matter exists on the surface of the magnetic transfer carrier, when both are put into contact with each other for magnetic transfer, a depression arises on the surface of the magnetic record medium by the tiny foreign matter, some times with a resultant tiny protrusion around the depression. When data record is reproduced using the magnetic head, such a tiny protrusion on the magnetic record medium is put into contact with a magnetic head with the result that the magnetic head is thrown away, for example, at the instant of the contact, which causes record reproduction performance of the magnetic head to be reduced or a life time thereof to be shorter due to physical contact thereof with the hard disk, further tending to destruction of the hard disk itself by chance. Therefore, it is very important to clean a magnetic transfer carrier prior to magnetic transfer so as to remove the above described foreign matter by the cleaning, for which there has been conventionally proposed a cleaning method cleaning a surface of a magnetic transfer carrier with a cleaning tool.

In a case of such a cleaning method, a corner of a magnetic film on a surface of a magnetic transfer carrier is scraped away in cleaning with a cleaning tool and the scraped magnetic film is in some case attached onto the cleaning tool as broken pieces. In such a cleaning method, though the above described tiny protrusion on a surface of a magnetic transfer carrier is removed by the cleaning tool, broken pieces from the magnetic film are attached as foreign matter onto the surface of a magnetic transfer carrier by way of the cleaning tool and magnetic transfer is inconveniently performed onto a hard disk, which is a magnetic record medium, with the magnetic transfer carrier having the foreign matter attached thereon.

In a conventional cleaning method, therefore, a necessity came to occur for frequent cleaning a cleaning tool itself, thereby leading to addition of an extra cleaning step, reduction in productivity for hard disks, increase in production cost of disks, further a need for expensive apparatus for cleaning a cleaning tool itself and others with a resultant high cost as a whole.

It is accordingly an object of the present invention to provide a cleaning method capable of performing cleaning of a magnetic transfer carrier at low cost with certainty, without a need for an apparatus dedicated to cleaning of a cleaning tool itself.

DISCLOSURE OF THE INVENTION (1) A cleaning method of the present invention includes: a first step of placing a dummy carrier having at least one recess thereon, said recess opening toward an outer periphery thereof from an inner periphery thereof on a rotary stage used for placing a magnetic transfer carrier thereon, the magnetic transfer carrier having plural radial recesses thereon each opening toward an outer periphery thereof from an inner periphery thereof; and a second step of sliding a cleaning tool for cleaning the magnetic transfer carrier on the dummy carrier toward the outer periphery thereof from the inner periphery thereof while rotating the dummy carrier with the rotary stage in rotation. Note that shapes of the magnetic transfer carrier and the dummy carrier each are not limited to the shape of a disk.

According to the cleaning method of the present invention, in order to clean the cleaning tool, the dummy carrier has only to be placed on the rotary stage used for cleaning of the magnetic transfer carrier. Therefore, the cleaning method makes an apparatus dedicated to cleaning of the cleaning tool itself unnecessary, thereby enabling cleaning of the magnetic transfer carrier at a low cost with certainty.

In the second step of the present invention, preferably, the cleaning tool is slid toward the outer periphery from the inner periphery on the dummy carrier while rotating the dummy carrier in substantially the same direction as on the magnetic transfer carrier when being cleaned.

In the present invention, preferably, a shape of the at least one recess on the dummy carrier and a shape of each recess on the magnetic transfer carrier are substantially the same as each other. In such a situation, when the cleaning tool received a cleaning action by the dummy carrier, it has been already adapted to the at least one recess of the dummy carrier; therefore, when the magnetic transfer carrier having the plural recesses thereon each with the same shape as that of the at least one recess on the dummy carrier is cleaned with the cleaning tool, the cleaning can be preferably carried out with certainty and ease.

In the present invention, preferably, a press contact force of the cleaning tool to the dummy carrier when the cleaning tool is slid on the dummy carrier in cleaning is made substantially the same as that of the cleaning tool to the magnetic transfer carrier when the cleaning tool is slid on the magnetic transfer carrier in cleaning.

In such a situation, when the cleaning tool received a cleaning action by the dummy carrier, it has been already adapted to the at least one recess of the dummy carrier; therefore, when the magnetic transfer carrier having the plural recesses thereon each with the same shape as that of the at least one recess on the dummy carrier is cleaned with the cleaning tool, the cleaning can be preferably carried out with certainty and ease.

In the present invention, preferably, a relative speed of the cleaning tool to the dummy carrier when the cleaning tool is slid on the dummy carrier in cleaning is made substantially the same or almost the same as that of the cleaning tool to the magnetic transfer carrier when the cleaning tool is slid on the magnetic transfer carrier in cleaning.

In such a situation, when the cleaning tool received a cleaning action by the dummy carrier, it has been already adapted to the at least one recess of the dummy carrier; therefore, when the magnetic transfer carrier having the plural recesses thereon each with the same shape as that of the at least one recess on the dummy carrier is cleaned with the cleaning tool, the cleaning can be preferably carried out with certainty and ease.

(2) A magnetic transfer carrier of the present invention is a magnetic transfer carrier, on which an information signal is recorded, and which is used in magnetic transfer of the information signal onto a magnetic record medium in contact therewith, and has a structure in which a recess for close contact between the magnetic transfer carrier and the magnetic record medium in magnetic transfer is formed on a magnetic transfer surface thereof facing the magnetic record medium, and the recess has a shape to open toward an outer periphery of the magnetic transfer carrier from an inner periphery thereof and in addition, serves as a recess for cleaning the magnetic transfer carrier.

According to the magnetic transfer carrier of the present invention, since the recess for close contact is used as the recess for cleaning when the magnetic transfer carrier is cleaned with the cleaning tool, if the cleaning tool has been used, for cleaning thereof, in cleaning of a surface of the dummy carrier on which a recess in the same shape as the recess for close contact is formed, the cleaning tool is already in a state to be adapted to the shape of the recess for cleaning on the magnetic transfer carrier, which makes it possible not only for the cleaning to be easy, but also for foreign matter attached on the magnetic transfer carrier to be discarded through the recess for cleaning opening toward the outer periphery thereof further to outside thereof, thereby attaining the magnetic transfer carrier easy in control of the cleaning.

Note that the cleaning tool includes a tool in the shape of a pad, a brush, a roller and the others.

In the present invention, preferably, the magnetic transfer carrier has not only plural radial contact portions thereon for magnetic transfer onto the magnetic record medium, opening toward the outer periphery thereof from the inner periphery thereof on the magnetic transfer surface, but also the recess for cleaning is provided radially at least between contact portions of one pair.

In this case, since the recess for cleaning is radially formed in a direction toward the outer periphery of the magnetic transfer carrier, when the cleaning tool is slid thereon while rotating the magnetic transfer carrier, the foreign matter can be preferably removed to outside thereof with good efficiency.

In the present invention, preferably, the close contact recess is enlarged in width toward the outer periphery of the magnetic transfer carrier from the inner periphery thereof.

With such a shape of the close contact recess adopted, the foreign matter can be preferably removed to outside thereof with better efficiency.

(3) A disk cleaning apparatus of the present invention includes: a holding section capable of holding a first disk to be cleaned and a second disk used as a dummy, a cleaning tool disposed facing each of both disks held by the holding section; and a sliding section sliding the cleaning tool relatively on each of both disks in cleaning, and is operable according to a procedure including a step of sliding the cleaning tool on the second disk relatively thereto in a state where the second disk is held by the holding section to clean the cleaning tool; and a step of sliding the cleaning tool cleaned in the previous step on the first disk relatively thereto in a state where the first disk is held by the holding section to clean the first disk.

According to the present invention, since in the cleaning step for the cleaning tool, the cleaning tool is cleaned by sliding thereof on the second disk and the first disk is cleaned in the cleaning step for the first disk, the cleaning tool, which is adapted to the second disk in cleaning thereof, can clean the first disk with ease.

The present invention, in cleaning, preferably has a control mechanism that moves the cleaning tool across the second disk covering every part thereof to as far as outside of the outer periphery edge thereof.

In this case, foreign matter attached to the cleaning tool preferably loses a second chance to attach thereto since the foreign matter is sent out to outside of the second disk.

The present invention, in cleaning, preferably has a control mechanism that moves the cleaning tool across the first disk covering every part thereof to as far as outside of the outer periphery edge thereof.

In this case, foreign matter attached to the first disk preferably loses a chance to remain attached thereto since the foreign matter is sent out to outside of the first disk.

Preferably, the present invention uses a magnetic transfer carrier, as the first disk, on which information signals are recorded, and which is used for magnetic transfer of the information signals in a state of being in contact with a magnetic record medium, and having at least one recess opening toward an outer periphery thereof from an inner periphery thereof on a magnetic transfer surface facing the magnetic record medium, and uses a dummy carrier, as the second disk, having a recess of almost the same shape as that of the at least one recess of the magnetic transfer carrier on at least one surface thereof.

In this case, preferably, foreign matter attached to the cleaning tool is sent out to the outer periphery of the dummy carrier with ease and simplicity when the cleaning tool is cleaned with the dummy carrier since the dummy carrier has a radial recess extending toward the periphery thereof from the inner periphery thereof, and the cleaning tool has been already adapted to the shape of the recess on the dummy carrier, so the magnetic transfer carrier can be cleaned with ease.

(4) A dummy carrier of the present invention, in correspondence to a magnetic transfer carrier used for magnetic transfer of an information signal with plural radial recesses each extending toward an outer periphery thereof from an inner periphery thereof on a magnetic transfer surface thereof; has a radial recess extending toward an outer periphery thereof from an inner periphery thereof on at least one surface thereof, a shape of which recess is the same or substantially the same as that of each of the plural radial recesses on the magnetic transfer surface, and is used for cleaning of a cleaning tool by sliding the cleaning tool on a surface of the dummy carrier while the dummy carrier is held by a holding section of a disk cleaning apparatus.

According to the present invention, the cleaning tool can be preferably used in cleaning of the dummy disk. In this case, since the dummy disk has the radial recess on the surface thereof, when the cleaning tool is cleaned on the surface, foreign matter attached to the surface can be certainly removed by the cleaning tool through the recess opening toward the outer periphery thereof to outside of the dummy carrier, thereby attaining a magnetic transfer carrier easy in control of the cleaning.

(5) A carrier cleaning apparatus of the present invention is a cleaning apparatus for a magnetic transfer carrier having a magnetic film corresponding to an information signal formed on a surface on a substrate, and includes a holding section holding the magnetic transfer carrier having a recess of a radial shape extending toward an outer periphery thereof from an inner periphery thereof with an edge at the outer periphery opening to outside thereof; a cleaning tool disposed facing a surface of the magnetic transfer carrier on which the magnetic film is formed; and a sliding section sliding the cleaning tool on the magnetic transfer carrier relatively thereto, wherein in cleaning, the sliding section presses the cleaning tool to the magnetic transfer carrier at a prescribed quantity of press-down and keeping this state, slides the cleaning tool toward the outer periphery from the inner periphery in conformity to the radial shape of the recess.

With such a configuration adopted, foreign matter attached on the surface and in the recess of the magnetic transfer carrier can be removed with ease and certainty and avoidance can be perfectly made on destruction of a magnetic head and a magnetic record medium caused by contact between the magnetic record medium and the magnetic head due to the presence of foreign matter therebetween.

In the present invention, on a surface of the magnetic transfer carrier, an area of a central portion having no part of a recess is preferably larger than an area in which the cleaning tool is in contact with the magnetic transfer carrier. This is because, when the cleaning tool is pressed into the magnetic transfer carrier prior to the start of cleaning, there occurs no contact of the cleaning tool with depressions and protrusions formed by the recess.

In the present invention, the cleaning tool is preferably a rotary brush rotating about a line, as an axis, in a direction in substantially parallel to a normal to the magnetic transfer carrier.

In the present invention, if a radius of the rotary brush is r (mm), a cycle of sliding repetition in sliding of the rotary brush driven by the sliding section is t(s), a radius of the magnetic transfer carrier of an almost circular shape is R (mm), and a rotation speed of the magnetic transfer carrier when being rotated by the holding section is x (rps) by definition, a relation of $\pi t \times R < r$ is preferably established. This is because cleaning over all of the surface of the magnetic transfer carrier can be performed with certainty.

In the present invention, if a depth of a recess on the magnetic transfer carrier is M (mm) and, a press-down quantity of the rotary brush into the magnetic transfer carrier in cleaning is N (mm) by definition, a relation of N/M>10 is preferably established. This is because with such a relation established, foreign matter can be removed with more of certainty.

In the present invention, the recess is preferably enlarged in width toward the outer periphery from the inner periphery. This is because foreign matter can be sent out to the outer periphery side with more of certainty.

In the present invention, the cleaning tool is preferably slid to as far as outside of an outer periphery edge of a magnetic film on a surface of the magnetic transfer carrier on which the magnetic film is formed. This is because foreign matter can be removed with certainty, without remaining at the outer periphery edge of the magnetic transfer carrier.

In the present invention, preferably, the recess is of the sectional shape of a substantially circular arc, the cleaning tool pivoted around a prescribed position as a center, and a curvature radius of the circular arc and a radius of the pivoting motion of the rotary brush are almost in coincidence with each other. This is because foreign matter attached to the recess can be sent out with more of certainty.

(6) A cleaning method of the present invention is a cleaning method for a magnetic transfer carrier having a magnetic film corresponding to an information signal formed on a surface of a substrate and includes the steps of: holding the magnetic transfer carrier having a recess of a radial shape extending toward an outer periphery thereof from an inner periphery thereof with an edge at the outer periphery opening to outside thereof; and sliding a cleaning tool disposed facing a surface of the magnetic transfer carrier on which a magnetic film is formed, relatively thereto, wherein in cleaning, the sliding section presses the cleaning tool to the magnetic transfer carrier at a prescribed quantity of press-down and keeping this state, slides the cleaning tool toward the outer periphery from the inner periphery in conformity to the radial shape of the recess.

With such a configuration adopted, foreign matter attached on the surface and in the recess of the magnetic transfer carrier can be removed with ease and certainty and avoidance can be perfectly made on destruction of a magnetic head and a magnetic record medium caused by contact between the magnetic record medium and the magnetic head due to the presence of foreign matter therebetween.

A magnetic transfer carrier cleaned using the cleaning method and the cleaning apparatus described above are free from foreign matter, which has been removed, with certainty. Therefore, when a magnetic record reproducing apparatus is operated on a magnetic record medium on which information signals have been magnetically transferred from such a magnetic transfer carrier, high quality record reproduction can be enabled in which there is produced no destruction of a magnetic head and a magnetic record medium by contact between the magnetic record medium and the magnetic head caused by foreign matter present therebetween.

BRIEF DESCRIPTION OF THE DRAWINGS

FIG. 1 is a view showing a state where a magnetic transfer carrier and a magnetic record medium are spaced apart away from each other in a magnetic transfer apparatus according to an embodiment of the present invention;

FIG. 3 is a perspective view of the magnetic transfer carrier of FIG. 1;

FIG. 5 is a schematic plan view of the magnetic transfer carrier of FIG. 1;

FIG. 10 is a sectional view showing a way of magnetic transfer;

FIG. 11 is a perspective view of a configuration of a cleaning apparatus of the embodiment;

FIG. 12 is a top view showing cleaning of FIG. 11;

FIG. 15 is a perspective view of the magnetic transfer apparatus according to the other embodiments of a present invention;

BEST MODE FOR CARRYING OUT THE INVENTION

Referring to the accompanying drawings, description will be given of a magnetic transfer apparatus using a magnetic transfer carrier according to an embodiment in the best mode of the present invention below.

Figure 2:
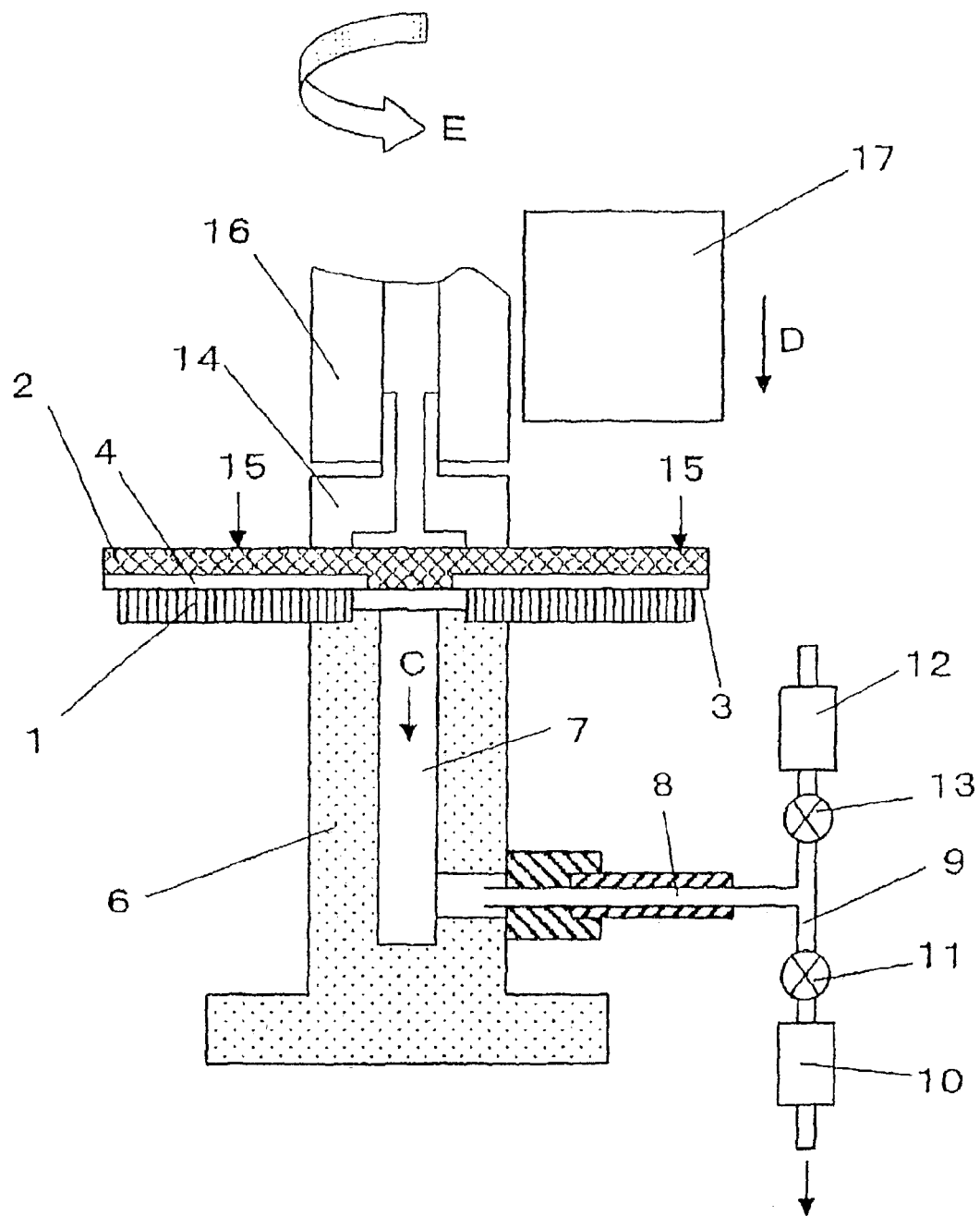
FIG. 2 is a view showing a state where the magnetic transfer carrier and the magnetic record medium are in close contact with each other in the magnetic transfer apparatus according to the embodiment of the present invention.

Referring to FIGS. 1 to 3, a reference numeral 1 indicates a magnetic record medium such as a magnetic disk on which information signals are to be transferred; 2 a disk-shaped magnetic transfer carrier, on which the information signals are recorded to perform magnetic transfer of the information signals onto the magnetic record medium 1; 3 plural radial contact portions for contact with the disk-shaped magnetic record medium 1 in magnetic transfer, provided on one surface of the magnetic transfer carrier 2; and 4 radial recesses.

The radial recesses 4 each are depressed into the bulk of the substrate compared with the corresponding radial contact portion 3 between adjacent radial contact portions 3 and opens toward the outer periphery of the magnetic transfer carrier 2 from the inner periphery thereof. The radial recesses 4 each serve as a cleaning recess as described later and a depth thereof is preferably set to a value of the order of 5 μm.

A reference numeral 6 indicates a support stage for supporting the magnetic record medium 1; 7 a vent hole provided for flowing of a gas into the central section of the support stage 6; 8 a passage through which a gas between the magnetic transfer carrier 2 and the magnetic record medium 1 is discharged or a gas is forcibly fed therebetween; 9 a gas discharge port for discharging a gas from the passage 8; 10 a suction pump connected to the gas discharge port 9; an 11 an exhaust valve for controlling an exhaust of the gas. A reference numeral 12 indicates a gas feed pump for forcibly feeding a gas into the passage 8; 13 a gas feed valve controlling a feed of the gas. The gas feed pump 12 is equipped with an air filter (not shown) of 0.01 μm in pore size such that foreign matter of 0.01 μm or more across is not forcibly fed into the passage 8.

A reference numeral 14 indicates an arm being fixedly mounted on the magnetic transfer carrier 2 to hold. The magnetic transfer carrier 2 is fixedly mounted onto the holding arm 14 by sucking a gas through the through hole provided to the holding arm 14. The holding arm 14 is freely slidably positioned at a proper position along the vertical direction by a guide member 16 by way of a boss section at the top side thereof.

Detailed description will be given of a process associated with suction/forced feed.

First of all, with reference to FIG. 1, there will be described of a moving-apart step of moving the magnetic transfer carrier 2 and the magnetic record medium 1 apart away from each other by forced feed of air, which is an example of the gas. The exhaust valve 11 is closed while the gas feed valve 13 is opened and in this state, the gas feed pump 12 is operated. With this operation, the gas is caused to flow into the passage 8. By doing so, air is forcibly fed upwardly as shown with an arrow mark A of FIG. 1 through the vent hole 7. Thereby, the air forcibly fed into the vent hole 7 pushes up the magnetic transfer carrier 2. The air is forcibly fed to the recesses 4 as shown with an arrow mark B. The air forcibly fed into the recesses 4 not only expands and advances radially toward the outer periphery of the magnetic transfer carrier 2 from the center portion thereof through the recesses 4, but are also released into the atmospheric air through clearances including the recesses 4 between the magnetic transfer carrier 2 and the magnetic record medium 1.

Figure 4:
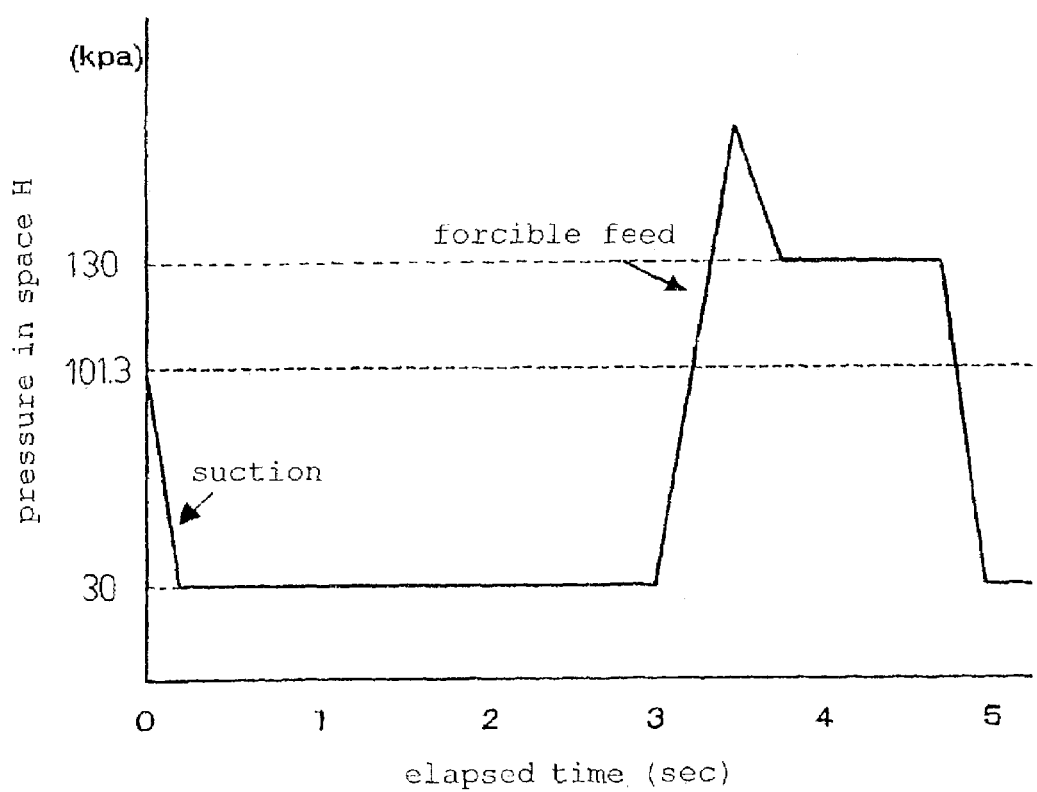
FIG. 4 is a graph showing a relationship between a time and a pressure in an internal space A of a support stage for the magnetic record medium of FIG. 1.

FIG. 4 shows a relationship between an elapsed time in the step above and a pressure in a space H interposing between the magnetic transfer carrier 2 and the magnetic record medium 1, and after elapsing 3 seconds in the figure, the pressure in the space H increases rapidly in an instant from 101.3 kpa upward and thereafter, is kept at a pressure of the order of 130 kpa for about 1 sec, which period corresponds to a state where the magnetic transfer carrier 2 and the magnetic record medium 1 stay apart away form each other.

The magnetic transfer carrier 2 and the magnetic record medium 1 move apart way from each other starting a state of being in close contact with each other and when the magnetic transfer carrier 2 rises by 0.5 mm in one piece with the holding arm 14, the top surface of the holding arm 14 is put into contact with the lower surface of the guide member 16. Thereby, a moving-apart distance between the magnetic record medium 1 and the magnetic transfer carrier 2 is controlled.

Referring to FIG. 2, description will be given of a close contact process in which the magnetic record medium 1 and the magnetic transfer carrier 2 are put into close contact with each other by suction of air.

The gas feed pump 12 is ceased to be out of operation and the gas feed valve 13 is closed. Then, the holding arm 14 on which the magnetic record medium 1 is fixedly mounted is moved downward by its own weight to be settled on the magnetic record medium 1. Thereafter, the exhaust valve 11 is opened and the suction pump 10 is operated.

By doing so, since the gas in the vent hole 7 is discharged downward as shown with an arrow mark C of FIG. 2, the gas in the recesses 4, that is the gas in the space H. is also discharged through a clearance between a hole defined by the inner periphery of the magnetic record medium 1 and a boss 5.

Since the recesses 4 each are of a shape to extend through the edge of the outer periphery of the magnet transfer carrier 2 as shown in FIG. 3, the magnetic transfer carrier 2 and the magnetic record medium 1 are in close contact with each other along all of the periphery. For this reason, a pressure in the space H between the magnetic transfer carrier 2 and the magnetic record medium 1 is reduced lower than the atmospheric pressure. Accordingly, the magnetic record medium 1 is pressed to the magnetic transfer carrier 2 by the action of the atmospheric pressure 15. In FIG. 4, a division of 30 kps in pressure in the space H corresponds to the above described close contact state.

Then, a magnet 17 is moved toward in the direction of an arrow mark D as shown in FIG. 2 so as to be close to the magnetic transfer carrier 2. When a distance of the magnet 17 close to the magnetic transfer carrier 2 reaches a value of the order of 1 mm, movement of the magnet 17 in the direction of an arrow mark D is ceased. Then, the magnet 17 is revolved in the circular periphery direction of the magnetic record medium 1, that is in a direction of an arrow mark F, by one revolution or more. With the revolution, a necessary magnetic field for magnetic transfer is applied to the magnetic transfer carrier 2.

Here, detailed description will be given of the magnetic transfer carrier 2 referring to FIGS. 5 to 7. FIG. 5 shows a schematic plan view of one example of the magnetic transfer carrier 2. As shown in FIG. 5, a signal region 2a is formed almost radially on one major surface of the magnetic transfer carrier 2, that is a surface of the magnetic transfer carrier 1 in contact with a ferromagnetic thin film surface of the magnetic record medium 1. FIGS. 3 and 5 each are a view showing a model and actually, the signal region 2a is formed on a contact portion 3 in FIG. 3.

Figure 6:
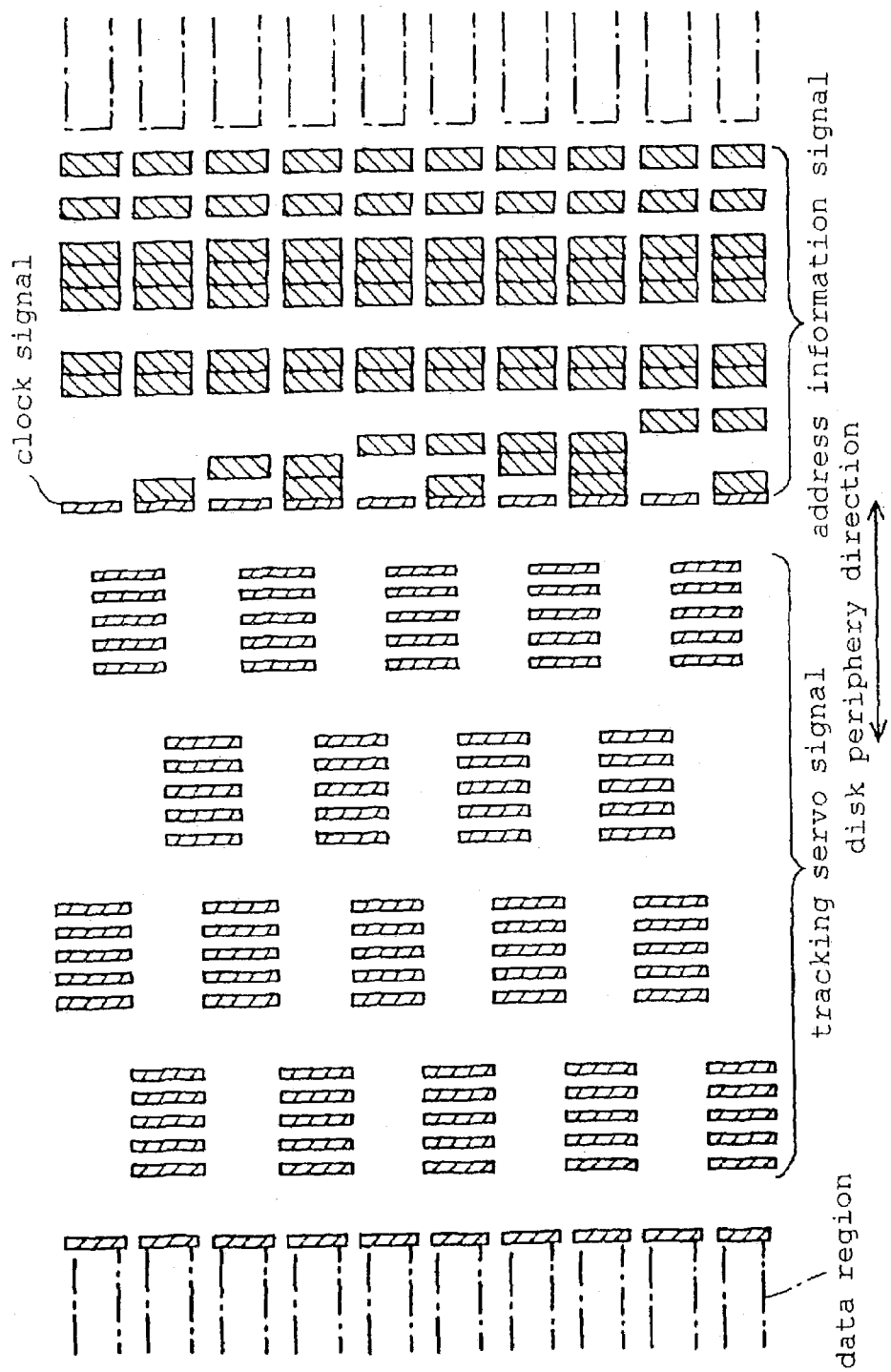
FIG. 6 is an enlarged view of a part A' of FIG. 5.

FIG. 6 schematically shows an enlarged view of part A' enclosed by a dotted line of FIG. 5. In the signal region 2a, as shown in FIG. 6, there are formed digital information signals recorded on the magnetic record medium 1, for example, a magnetic transfer information pattern constituted of magnetic portions made of a ferromagnetic thin film, corresponding to information signals at positions in conformity to preformat recording.

In FIG. 6, portions shaded by hatching show magnetic portions made of a ferromagnetic thin film. The magnetic transfer information pattern shown in FIG. 6 is a pattern with a configuration in which information signals such as a clock signal, a tracking servo signal, an address information signal, and other digital signals are arranged sequentially in the direction of a track length. The magnetic transfer information pattern shown in FIG. 6 is one example, and a configuration, arrangement and others of a magnetic transfer information pattern are properly determined according to information signals to be magnetically transferred onto the magnetic record medium 1.

For example, in a case where as in a hard disk drive, a reference signal is recorded on a magnetic film of a hard disk, which is a magnetic record medium, and preformat recording of a tracking servo signal and other signals is further performed on the basis of the reference signal, the following procedure may be adopted in which a magnetic transfer carrier according to the present invention is used to transfer record only a reference signal used in preformat recording in advance on a magnetic film of a hard disk and then the hard disk is installed into a case of the drive, followed by preformat recording of a tracking servo signal and other signals performed with a magnetic head of the hard disk drive.

Figure 7:
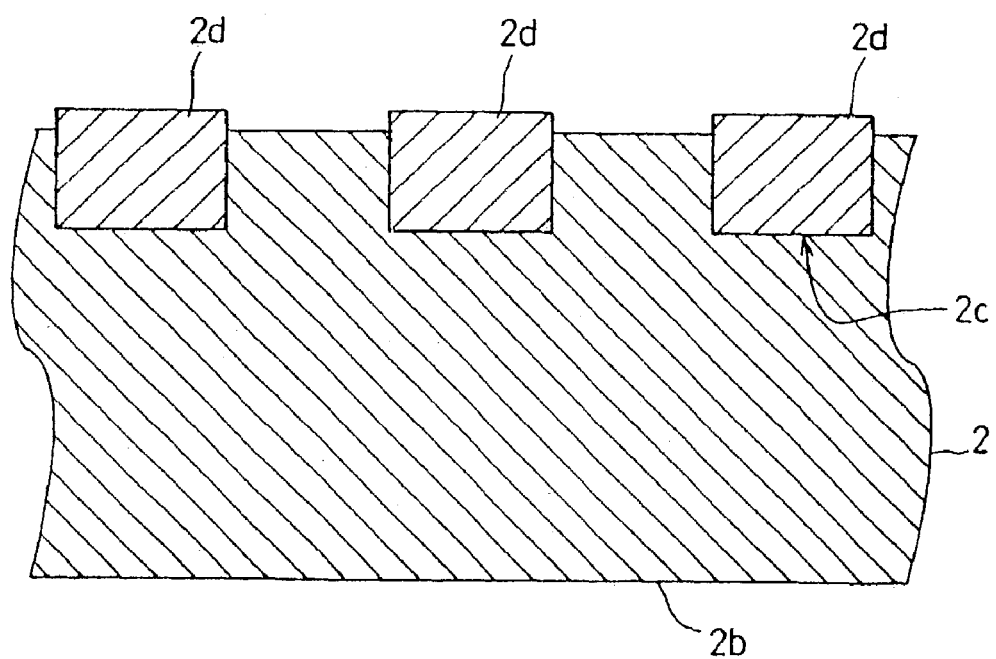
FIG. 7 is a partially sectional view of a region shown in FIG. 6.

FIG. 7 shows a partial section of the magnetic transfer carrier 2. The magnetic transfer carrier 2 has a substrate 2b, as shown in FIG. 7, made of a non-magnetic material such as a Si substrate, a glass substrate, a plastic substrate or the like in the shape of a disk. On one major surface of the substrate 2b, that is on a surface thereof with which a surface of the magnetic record medium 1 is in contact, there are formed plural fine recessed portions 2c corresponding to information signals in an arrangement pattern. A ferromagnetic film 2d, which is a magnetic portion, is formed in the recessed portions 2c on the substrate 2b.

As materials of the ferromagnetic thin film 2d on the magnetic transfer carrier 2, they have only to be magnetic materials capable of transfer recording a digital information signal on a magnetic record medium and no specific limitation is imposed on its nature in terms of hardness, such as hard, semi-hard or soft. As materials of the ferromagnetic thin film 2d, there can be exemplified, for example, Fe, Co, Fe—Co alloy and others. Note that a higher saturation magnetic flux density of a magnetic material is more preferably accepted in order to generate a sufficient recording magnetic field regardless of a kind of a magnetic record medium on which information signals are written. Especially in cases of a magnetic record medium with a high coercive force in excess of 200 Oe and a flexible disk with a thick magnetic layer, there arises a chance to disable sufficient recording thereon at a saturation magnetic flux density of 0.8 T or less. For this reason, there are used a magnetic material with a saturation magnetic flux density of generally 0.8 T or more and preferably 1.0 T or more.

A thickness of the ferromagnetic thin film 2d of the magnetic transfer carrier 2 is dependent on a bit length, saturation magnetization of a magnetic record medium and a film thickness of a magnetic layer. For example, in a case where a bit length is about 1 µm, a saturation magnetization and a thickness of a magnetic layer of the magnetic record medium are about 500 emu/cc and about 20 nm, respectively, a thickness of the ferromagnetic thin film 2d has only to be of the order of a value in the range of from 50 nm to 500 nm.

In order to acquire a good quality of such magnetically transferred signals, it is desirable to uniformly excite and magnetize the ferromagnetic thin films 2d in preformat recording on the basis of an arrangement pattern of a soft magnetic thin film or a semi-hard magnetic thin film as the ferromagnetic thin film 2d provided onto the magnetic transfer carrier 2. Furthermore, it is desirable to apply uniform direct-current erase to the magnetic record medium 1 such as a hard disk prior to signal recording using the magnetic transfer carrier.

Description will be given of a fabrication method for the magnetic transfer carrier 2.

A resist film is formed on a surface of a Si substrate. Then, the resist film is subjected to exposure and developing to finally be patterned using a lithographic technology with a laser beam or an electron beam such as in a photolithographic method. Thereafter, the resist film is etched by dry etching or the like technique to form a fine recess and protrusion profile corresponding to information signals on the resist film. Subsequent to this, a sputtering method, a vacuum evaporation method, an ion plating method, a CVD method, a plating method or the like is used to obtain a magnetic transfer carrier 2 provided with magnetic portions corresponding to information signals in a state where recessed portions are filled with a ferromagnetic thin film made of Co or the like.

No specific limitation is imposed to the above method as a method for forming a recess and protrusion profile on a surface of the magnetic transfer carrier 2 and for example, a fine recess and protrusion profile is directly formed using a laser beam, an electron beam or an ion beam or alternatively, such a profile may also be formed directly by machining.

Figure 8:
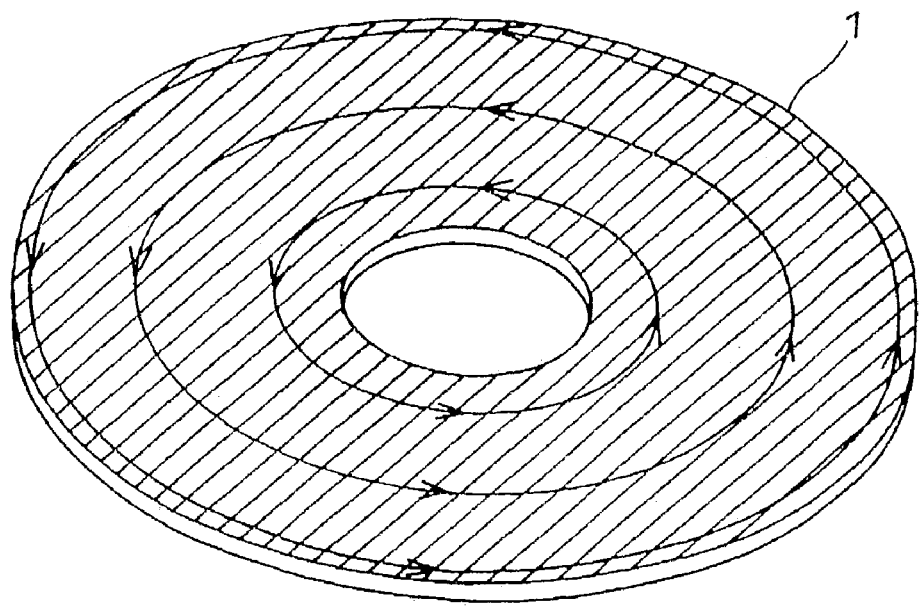
FIG. 8 is an illustration showing an initialization of a magnetic record medium in magnetic transfer.
Figure 9:
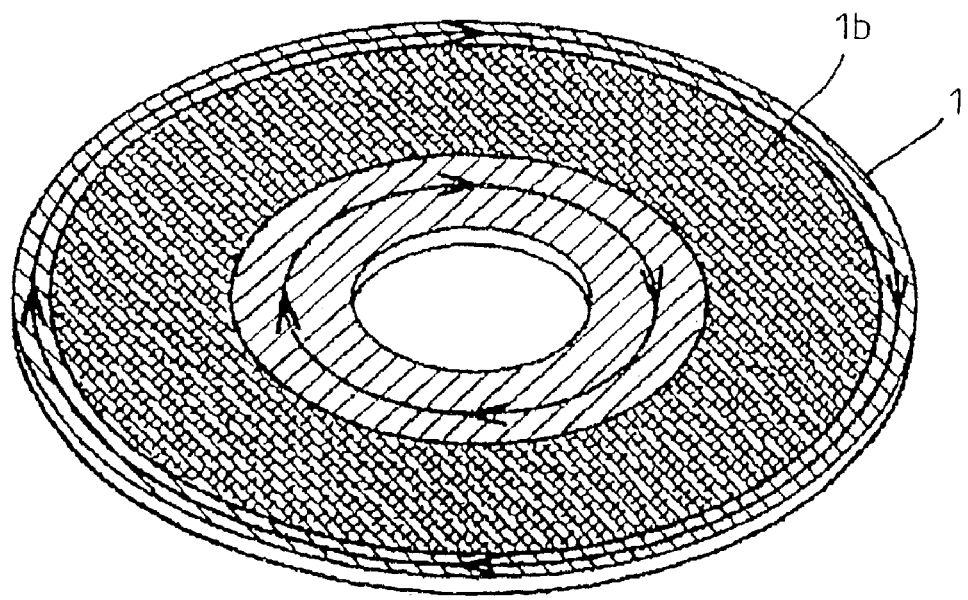
FIG. 9 is an illustration showing magnetic transfer on a magnetic record medium.

Then, information signals corresponding to a pattern formed on the magnetic transfer carrier 2 are subjected to transfer recording, a procedure for which will be described with reference to FIGS. 8 to 10.

At first, the magnet 17 is moved close to the magnetic record medium 1. In this state, the magnet 17 is rotated in parallel to the magnetic record medium 1 with a central axis of the magnetic record medium 1 as a rotation axis. Thereby, the magnetic record medium 1 is magnetized in one direction indicated by an arrow mark of FIG. 8 in advance (initialization).

Then, the magnetic transfer carrier 2 is superimposed on the magnetic record medium 1 after positioning. In this superimposed state, the magnetic transfer carrier 2 and the magnetic record medium 1 are put into uniform and close contact with each other. Thereafter, there is applied a magnetic field in a direction opposite to that in initialization. Thereby, the magnetic portions 2d of the magnetic transfer carrier 2 are magnetized. Information signals corresponding to an arrangement pattern of the magnetic portions 2d on the magnetic transfer carrier 2, as shown in FIG. 9, are magnetically transferred in a prescribed region 1b on the magnetic record medium 1 superimposed on the magnetic transfer carrier 2. Note that, an arrow mark indicated in FIG. 9 is a direction of a magnetic field of a magnetization pattern magnetically transferred onto the magnetic record medium 1.

In FIG. 10, there is shown details of a magnetization performed. As shown in FIG. 10, a magnetic field is applied to the magnetic transfer carrier 2 from outside in a state where the magnetic transfer carrier 2 is superimposed on the magnetic record medium 1 to magnetize the magnetic portions 2d on the magnetic transfer carrier 2. Thereby, information signals can be magnetically transferred to the ferromagnetic layer 1c on the magnetic record medium 1. That is, by using the magnetic transfer carrier 2 on which the magnetic portions 2d made of a ferromagnetic thin film in an arrangement pattern corresponding to prescribed information signals are formed on the non-magnetic substrate 2b, magnetic transfer recording can be performed onto the magnetic record medium 1 as a magnetization pattern corresponding to the information signals.

Note that as a method for magnetic transfer of a pattern on the magnetic transfer carrier 2 onto the magnetic record medium 1, a method is also available in which the magnetic portions 2d on the magnetic transfer carrier 2 are magnetized in advance and then in this state, the magnetic transfer carrier 2 is put into close contact with the magnetic record medium 1, thereby enabling writing of information signals, in addition to a method in which as described above, an external magnetic field is applied to the magnetic transfer carrier 2 and the magnetic record medium 1 in a state where both are in contact with each other.

Thereafter, the magnetic transfer carrier 2 and the magnetic record medium 1 again move apart away from each other as shown in FIG. 1. That is, the exhaust valve 11 is closed and the gas feed valve 13 is opened and the gas feed pump 12 is operated. Then, air is forcibly fed as shown by the arrow marks A and B and the magnetic transfer carrier 2 is moved in one piece with the holding arm 14 by the action of a force of the air forcibly fed. The magnetic transfer carrier 2 ceases its movement where the top surface of the holding arm 14 comes into contact with the guide member 16. At this time, as shown by the arrow mark B, the air is forcibly sent radially through the recesses 4 toward the outer periphery of the magnetic transfer carrier 2 from the center thereof, which state is kept on.

Here, if foreign matter exists on the contact portions 3 of the magnetic transfer carrier 2, a defect would occur on the magnetic record medium 1 by performing magnetic transfer.

Description will be given of a cleaning method with reference to FIGS. 11 to 13.

FIG. 11 is a perspective view of a construction of a disk cleaning apparatus.

In FIG. 11, the disk cleaning apparatus has a dummy carrier 102. A material of the disk dummy carrier 102 is a silicon wafer. The dummy carrier 102 has plural radial recesses 4' thereon with the same shape as the radial recesses 4 on the magnetic transfer carrier 2.

A reference numeral 103 indicates a rotary stage as a holding section holding the magnetic transfer carrier 2 and the dummy carrier 102. The rotary stage 103 rotate in a direction AA while holding the dummy carrier 102 with, for example, a static chuck. The rotary stage 103 also functions as a holding section for the magnetic transfer carrier 2, which is a disk to be cleaned.

A reference numeral 107 indicates a cleaner disk and 108 a cleaning tool in the shape of a pad made of polyurethane as a material, and the cleaning tool 108 is mounted along the outer periphery of the cleaning disk 107 and faces the recesses 4' on the dummy carrier 102. A reference numeral 109 is a rotation motor for autorotation of the cleaner disk 107 in the direction of an arrow mark BB, 110 a connecting arm connected to the rotation motor 109 at one end thereof and 111 a pivoting motion motor connected to the connecting arm 110 at the other end thereof and rotatable in the direction of an arrow mark CC. A reference numeral 112 indicates an air cylinder. The rotation motor 111 is placed on the air cylinder 112 and movable in the direction of an arrow mark DD.

A reference numeral 113 indicates a micrometer adjusting a movement of the air cylinder 112 in the direction of an arrow mark DD to adjust contact between the dummy carrier 102 and the cleaning tool 108, and 114 a jet port. The jet port 114 feeds pure water passing through a filter of 0.05 µm in pore size (not shown). The pure water is jetted between the dummy carrier 102 and the cleaning tool 108.

In such a cleaning apparatus, when the air cylinder 112 is positioned at an upper side thereof (the top of the arrow DD) of FIG. 11, the dummy carrier 102 and the cleaning tool 108 are moved apart away from each other, When the air cylinder 112 is positioned at a lower side thereof (the bottom of the arrow DD) of FIG. 11, the dummy carrier 102 and the cleaning tool 108 come into contact with each other. A contact press force acting between both 102 and 108 is adjusted by the micrometer 113 disposed at the lower end of the air cylinder 112.

When the air cylinder 112 is moved downward, a press-down quantity of the cleaning tool 108 into the dummy carrier 102 is set to 0.2 mm. To be detailed, the cleaning tool 108 is positioned at 0.2 mm downward from the contact position between the cleaning tool 108 and the dummy carrier 102. The position of the cleaning tool 108 is adjusted by the micrometer 113.

The constituents 109 to 113 cause the cleaning tool 108 to slide the cleaning tool 108 on the dummy carrier 102 or the magnetic transfer carrier 2 toward the outer periphery thereof from the inner periphery thereof to thus constitute a sliding section for cleaning the cleaning tool 108 and the magnetic transfer carrier 2.

First of all, the dummy carrier 102 is placed and held on the rotary stage 103. At this time, the air cylinder 112 is disposed at the upper side thereof in the direction of the arrow DD in the figure. In this state, the dummy carrier 102 and the cleaning tool 108 are moved apart away from each other. The cleaning tool 108 is disposed at a position FF in FIG. 12, that is a position outside of the dummy carrier 102 spaced therefrom.

Then, the cleaning tool 108, in FIG. 12, is pivoted around by the pivoting motion motor 111 from the position FF in the clockwise direction as viewed from above to as far as a position EE, that is the central position of the dummy carrier 102.

Then, the dummy carrier 102 is slowly rotated by the rotary stage 103 in the direction of the arrow mark AA, that is in the clockwise direction as viewed from above at a low speed of 20 rpm in rotation number, while the cleaning tool 108 is rotated by the rotation motor 109 in the direction of an arrow mark BB, that is in the clockwise direction as viewed from above at a high speed of 450 rpm in rotation number. In this state, a cleaning liquid is jetted from the jet port 114 toward between the dummy carrier 102 and the cleaning tool 108.

Then, the cleaning tool 108 is moved to the lower side in the direction of the arrow mark DD by the air cylinder 112. Thereby, the cleaning tool 108 and the dummy carrier 102 are relatively moved so as to be close to each other while both are rotated. After the approach, the cleaning tool 108 is ceased its vertical advance into the dummy carrier 102 at a press-down position of 0.2 mm in depth therein.

Then, the cleaning tool 108 is pivoted around by the pivoting motion motor 111 in the direction of the arrow mark CC, that is in the counter-clockwise as viewed from above. A moving speed thereof is set such that the cleaning tool 108 is pivoted around by a distance less than the diameter thereof in a period when the dummy carrier 102 is rotated one rotation by the rotary stage 103 wherein the cleaning tool 108 is eventually put into contact with all the surface of the dummy carrier 102.

With such an operation, foreign matter attached on the surface of the cleaning tool 108 is removed from the cleaning tool 108 by contact between the recesses 4' on the dummy carrier 102 and the cleaning tool 108 and sent out to outside of the dummy carrier 102 through the recesses 4'.

Then, the pivoting motion motor 111 is completely ceased out of operation when the cleaning tool 108 is at the position FF of FIG. 12, that is at a position spaced apart from the dummy carrier 102, in other words, at a position with no contact portion between the cleaning tool 108 and the dummy carrier 102. With such an operation, foreign matter attached on the surface of the cleaning tool 108 is sent out from the surface of the dummy carrier 102 to outside thereof with certainty.

Figure 13:
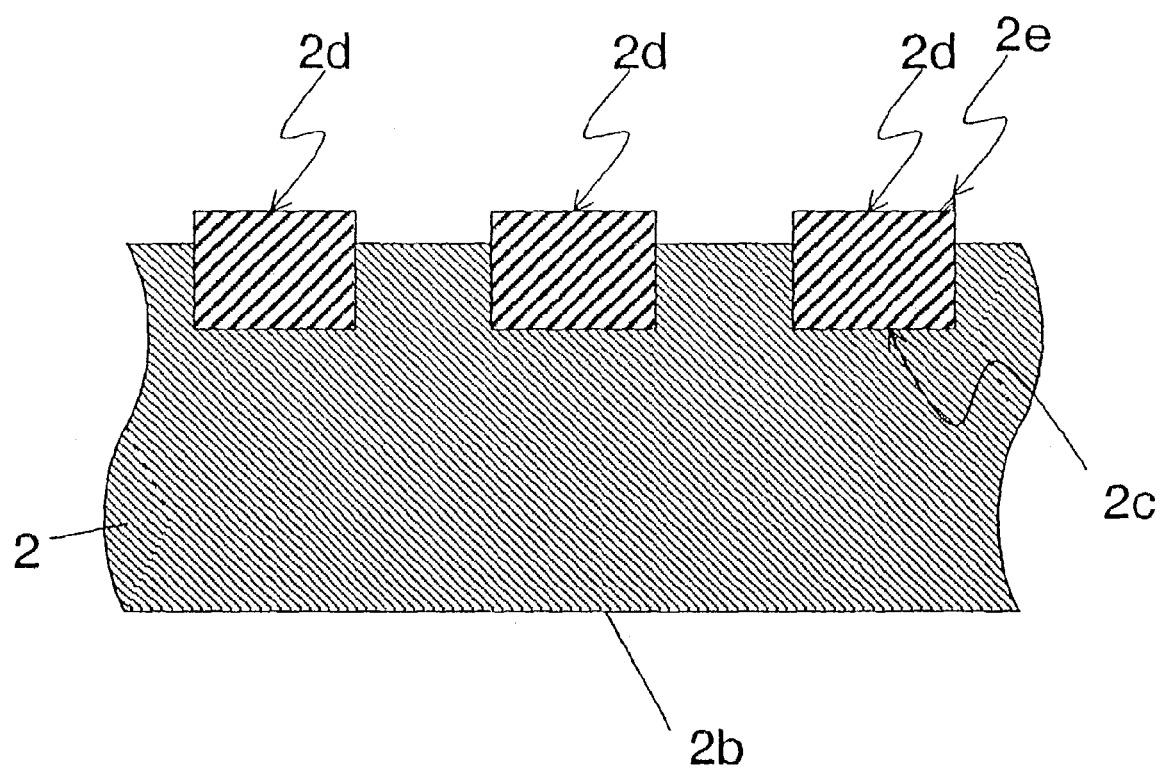
FIG. 13 is a partially enlarged sectional view of a magnetic transfer carrier.

Finally, after the air cylinder 112 is moved to the upper side in the direction of the arrow mark DD, the cleaning tool 108 is moved by the rotary motor 112 to its original position indicated by the arrow mark EE of FIG. 13.

By repeating such a series of cleaning related actions, foreign matter attached to the cleaning tool 108 is removed.

In the above case, an effect of adaptation of the cleaning tool 108 to the magnetic transfer carrier 2 can be enjoyed together with an effect of cleaning the cleaning tool under conditions that the recesses 4' of the dummy carrier 102 has the same shape as the recesses 4 of the magnetic transfer carrier 2; the contact press force acting between the dummy carrier 102 and the cleaning tool 108 and the contact press force acting between the magnetic transfer carrier 2 and the cleaning tool 108 are almost the same as each other; and the rotation numbers of the dummy carrier 102 and the cleaning tool 108 and the rotation numbers of the dummy carrier 102 and the cleaning tool 108, respectively, are substantially equal to each other.

The surface of the cleaning tool 108 are hardened when being left without protection. Therefore, the cleaning tool 108 is cleaned using the dummy carrier 102 in the same shape as the magnetic transfer carrier 2 prior to actual cleaning of the magnetic transfer carrier 2, which is a disk to be cleaned, in the same condition as for the magnetic transfer carrier 2. With such an operation, the cleaning tool 108 in an hardened state is rendered to be in a soft state, thereby ensuring an optimal state for the cleaning.

After cleaning of the cleaning tool 108, cleaning of the magnetic transfer carrier 2 is performed, wherein since the cleaning step is the same as the cleaning step for the cleaning step for the cleaning tool 108, the dummy carrier 102 has simply to be changed to the magnetic transfer carrier 2.

In a case where there is an abnormal part at an end of a magnetic film 2d formed on the surface of the magnetic transfer carrier 2 and thereby, for example, a burr 2e exists as shown in FIG. 13, there is a fear that the end thereof is scraped into broken pieces by the cleaning tool 108 and the broken pieces are attached to the cleaning tool 108, or alternatively, to the magnetic transfer carrier 2.

In the case of this embodiment, however, the broken pieces of the magnetic film attached to such a magnetic transfer carrier 2 are moved to outside of the magnetic carrier 2 along the recesses 4 thereon by pivoting motion and movement toward the outer periphery of the cleaning tool 108. Thereafter, when the cleaning tool 108 moves away from the magnetic transfer carrier 2, the broken pieces attached on the surface of the magnetic transfer carrier 2 are also sent out to the outside of the magnetic transfer carrier 2 since a shape of each recess on the magnetic transfer carrier 2 is in a state to open toward the outside side of the magnetic transfer carrier 2 as shown in FIG. 3.

As described above, the broken pieces of the magnetic film are certainly sent out to outside without remaining attached on the surface of the magnetic transfer carrier 2.

In this case, however, a possibility exists that broken pieces of a magnetic film stay as attached on the surface of the cleaning tool 108. In a case where the magnetic transfer carrier 2 is cleaned over plural straight times with the cleaning tool 108 or in a case where there remain many abnormal ends 2e of magnetic film as fabrication defects thereof, many broken pieces from the magnetic film have a chance to attach onto the surface of the cleaning tool 108.

Therefore, if the dummy carrier 102 is placed again on the rotary stage 103 and cleaning of the cleaning tool 108 similar to the above described way is performed, broken pieces from the magnetic film attached on the surface of the cleaning tool 108 are removed.

In such a way, in the case of this embodiment, broken pieces of a magnetic film attached on the surface of the cleaning tool 108 can be removed by a simple method without adding any special apparatus construction.

Note that the present invention is not limited to a method for alternately cleaning the dummy carrier 102 and the magnetic transfer carrier 2, each single cleaning step for the dummy carrier 102 or the magnetic transfer carrier 2 at a time, but a method may be adopted in which, for example, after the cleaning tool 108 is cleaned with the dummy carrier 12, a prescribed number of magnetic transfer carriers, for example 10 times are cleaned, followed by putting the dummy carrier 102 in place into the cleaning apparatus for the second time of cleaning of the cleaning tool 108.

It may be determined whether or not broken pieces are attached on the surface of the cleaning tool 108 by counting particles in a cleaning liquid. That is, a method may be adopted in which a publicly known in-liquid particle counter is used to count particles in a liquid and when the number of particles in the liquid exceeds a prescribed value, the dummy carrier 102 is put into a cleaning apparatus.

The present invention is not limited to one dummy carrier 102 used prior to a magnetic transfer carrier 2, but plural, for example 10, dummy carriers 102 may be consecutively used prior to the magnetic transfer carrier 2, and then an effect of cleaning the cleaning tool 108 is improved.

In the present invention, a configuration of the dummy carrier is not limited to one on which no magnetic film is formed, but for example, when a magnetic transfer carrier having a magnetic film thereon, no corner of which is chipped away by a brush, or corners of which have been sufficiently chipped away already is used, an equivalent effect can be attained.

The cleaning brush 108 of the present invention may be of the shape of a roll brush. In a case of a roll brush, the roll brush does not slide on a surface toward the outer periphery from the inner periphery, but slides by rolling. Note that the present invention includes other ways of sliding.

OTHER EMBODIMENTS

Figure 14:
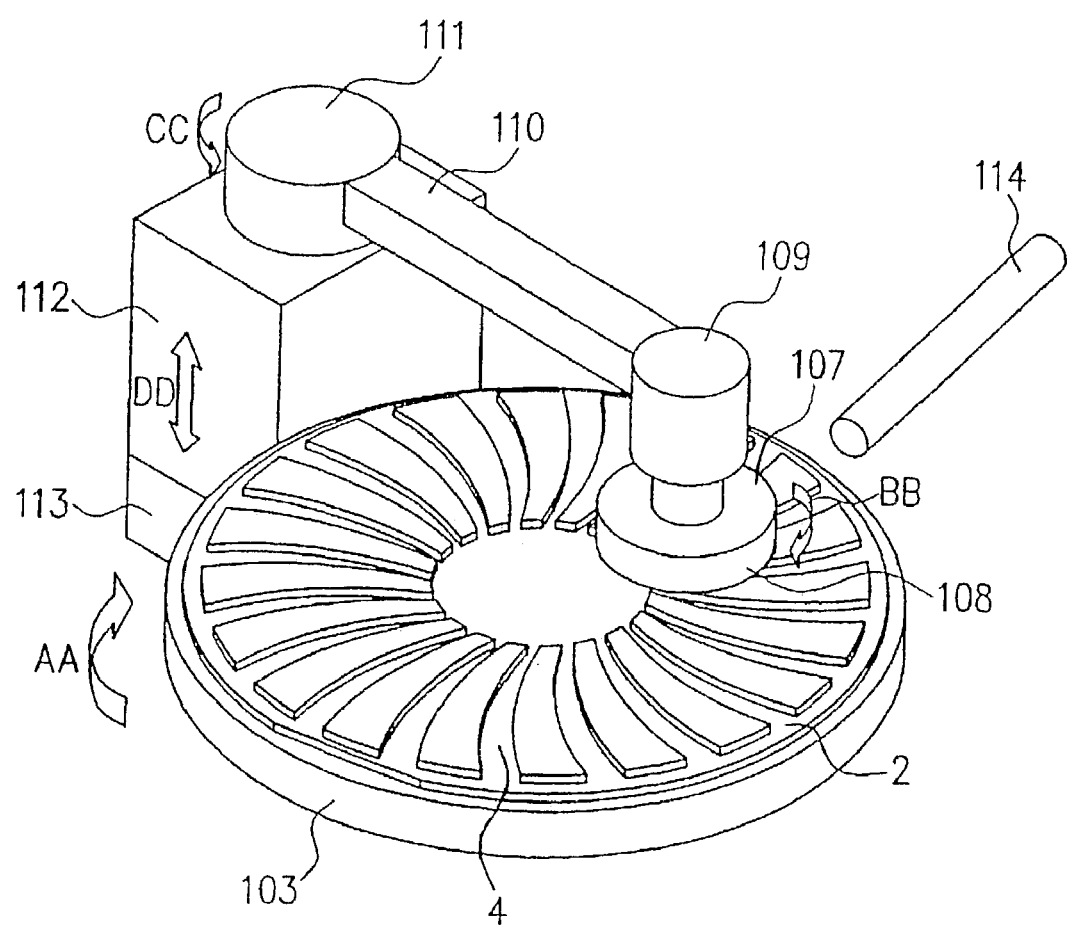
FIG. 14 is a perspective view of a magnetic transfer apparatus according to other embodiments of the present invention.

Description will be given of a cleaning method for a magnetic transfer carrier relating to a second embodiment of the present invention with reference to FIGS. 14 and 15. In FIG. 14, the same symbols are attached to constituents corresponding to those of FIG. 11. A configuration of an apparatus in use is such that the magnetic transfer carrier 2 made of a silicon substrate of 50 mm in diameter is held by the rotary stage 103 and rotatable at a rotation speed of 1 rpm in the direction of an arrow mark AA. A radius of the cleaning tool 108 constituted of a rotary brush is 10 mm. A radius of the cleaning tool 108 is set so as to be smaller than a radius of 13 mm of a region including the center, where no part of the recesses 4 on the magnetic transfer carrier 2 is formed.

A press-down quantity of the cleaning tool 108 into the magnetic transfer carrier 2 when the air cylinder 112 is moved downward is set to 0.20 mm. That is, the cleaning tool 108 and the magnetic transfer carrier 2 are in position adjusted by the micrometer 113 such that the cleaning tool 108 reaches a position at 0.2 mm in distance downward from a position at which the cleaning tool 108 and the magnetic transfer carrier 2 are in contact with each other.

Referring to FIG. 15, a configuration is adopted such that a curvature radius of an circular arc of each recess 4 coincides with approximately a distance between the center of the pivoting motion motor 111 and the center of the cleaning tool 108. A configuration is adopted such that the center of the pivoting motion motor 111 is positioned such that the center thereof coincides with approximately a locus of the curvature center of each recess 4 circular arc when the magnetic transfer carrier 2 is rotated.

The magnetic transfer carrier 2 is placed on the rotary stage 103 and held there by a static chuck. At that time, the air cylinder 112 is positioned at the upper side in the direction of the arrow mark DD shown in FIG. 14 and the magnetic transfer carrier 2 and the cleaning tool 108 are spaced apart from each other. The cleaning tool 108 is disposed at the position indicated by the arrow mark FF in FIG. 15.

The cleaning tool 108 is pivoted in the clockwise direction as viewed from above by the pivoting motion motor 111 to be moved to the position indicated by the arrow mark EE of FIG. 15, that is to as far as a position of the center of the magnetic transfer carrier 2.

The magnetic transfer carrier 2 is rotated in the direction of an arrow mark AA by the rotary stage 103 at a rotation number of one rpm, while the cleaning tool 108 is rotated in the direction of an arrow mark BB by the rotation motor 109 at a rotation speed of 450 rpm. In this state, a cleaning liquid is jetted from the jet port 114.

The cleaning tool 108 is moved to the lower head of the arrow mark DD by the air cylinder 112. Along with the movement, the cleaning tool 108 moves close to the magnetic transfer carrier 2 while rotating and ceases its vertical movement at a position where the cleaning tool 108 is pressed down into the magnetic transfer carrier 2 at 0.2 mm in depth. At this time, as shown in FIG. 15, a recess and protrusion profile of the recesses 4 have no chance to be put into direct contact with the cleaning tool 108 since a radius of 10 mm of the cleaning tool 108 is set smaller than a radius of the central region where no part of the recesses 4 exists.

The cleaning tool 108 is moved in the direction of an arrow mark CC by the pivoting motion motor 111. At this time, a moving speed of the rotation motor 11 is set at a value sufficiently larger than a rotation speed of 1 rpm of the magnetic transfer carrier 2 such that the cleaning tool 108 moves substantially along each recess 4.

Figure 16:
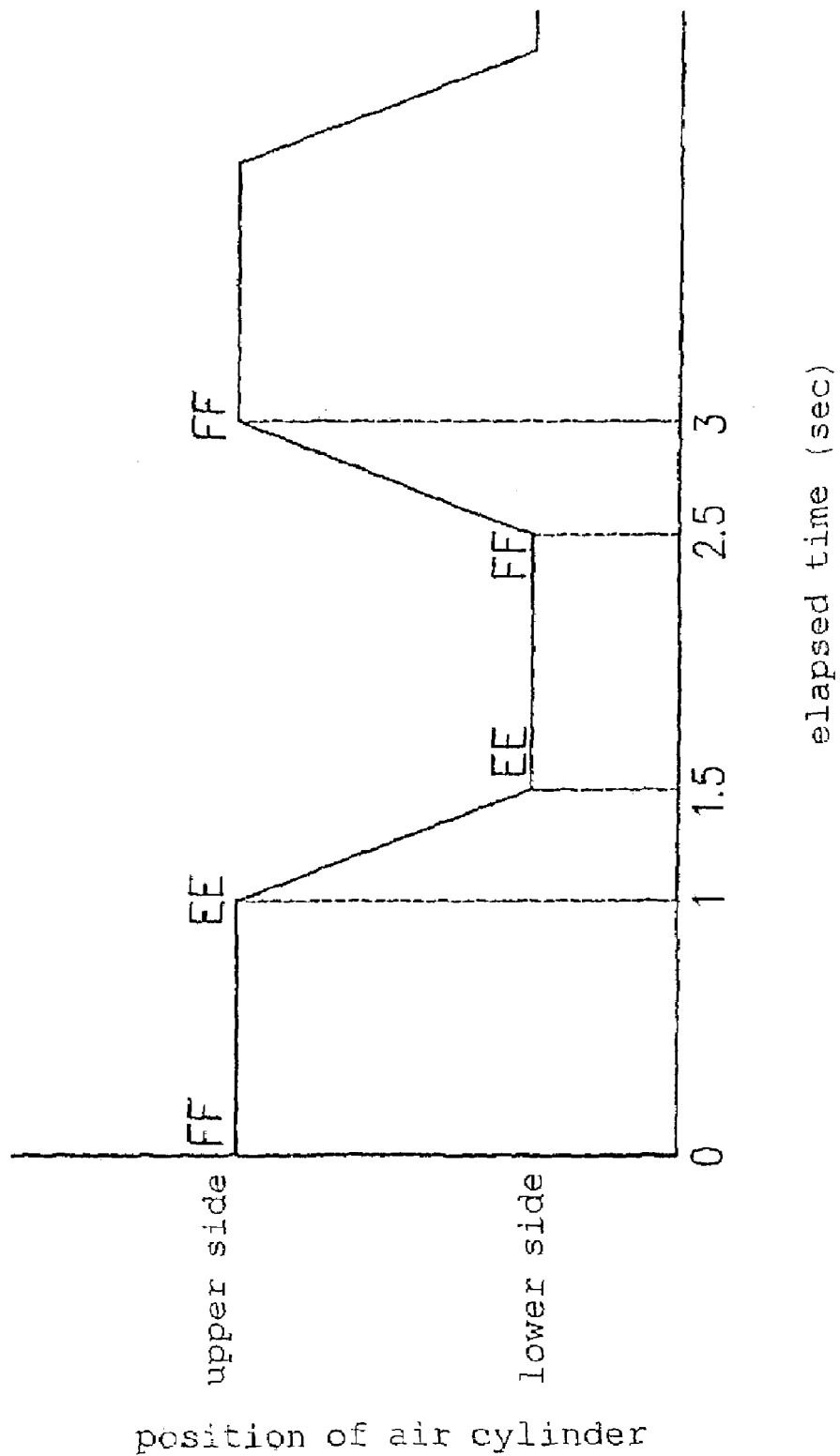
FIG. 16 is a graph showing a cycle of movement of a pivoting brush in the magnetic transfer apparatus according to the other embodiments of the present invention.

FIG. 16 is a graph showing a cycle of movement of the cleaning tool 108 in this case. In FIG. 16, the ordinate is assigned to a position of the air cylinder 112, while the abscissa is used for plotting an elapsed time. When the air cylinder 112 is positioned at the upper side, there is shown a state where the cleaning tool 108 and the magnetic transfer carrier 2 is spaced apart away from each other, while when the air cylinder 112 is positioned at the lower side, there is shown a state where the cleaning tool 108 and the magnetic transfer carrier 2 are in contact with each other.

At an elapsed time of 0 sec in FIG. 16, the graph shows a state where the air cylinder 112 is at the upper side and the cleaning tool 108 is disposed at the position indicated by the arrow mark FF in FIG. 15. At an elapsed time of 1 sec, the graph shows a state the air cylinder 112 is at the upper side and the cleaning tool 108 moves to a position indicated by the arrow mark EE in FIG. 15. At an additional elapsed time of 0.5 sec, the air cylinder 112 moves the lower side to come into contact with the magnetic transfer carrier 2.

Thereafter, the cleaning tool 108 moves from the position indicated by the arrow mark EE to the position indicated by the arrow mark FF in FIG. 15 while keeping the position of the air cylinder 112 at the lower side thereof. That is, the cleaning tool 108 slides on the surface of the magnetic transfer carrier 2 toward the outer periphery thereof from the inner periphery thereof.

At this time, since a radius of 10 mm of the cleaning tool 108 is set smaller than the central region where no part of the recesses 4 is formed, the cleaning tool 108 can be caused to be slid toward the outer periphery from the inner periphery with certainty especially in the section where radial shapes of the recesses 4 are formed.

The position indicated by the arrow mark FF is selected at a position where the cleaning tool 108 is spaced apart away from the outer periphery edge of the magnetic transfer carrier 2 such that the cleaning tool 108 and the magnetic transfer carrier 2 do not come into contact with each other.

Thereby, foreign matter does not remain at the outer periphery edge of the magnetic transfer carrier 2 and can be removed with certainty.

At an additional elapsed time of 0.5 sec, the cleaning tool 108 moves again to a position when the air cylinder 112 moves to the upper side thereof. Thereafter, a cleaning operation as described above is repeated to thereby remove foreign matter.

In this embodiment, a movement cycle of the cleaning tool 108 is set to 3 sec. In addition, a total cleaning time is set to be 5 min. Therefore, repetition of the movement of the rotary brush amounts to 100 cycles in total.

Since a rotation speed of the magnetic transfer carrier 2 is set to 1 rpm, and a radius thereof is set to 50 mm, the outer periphery edge of the magnetic transfer carrier 2 moves across a distance π×2×50 mm×(1/60)×3 sec=15.6 mm while the cleaning tool 108 operates in one cycle.

Since a radius of the cleaning tool 108 is 10 mm, the outer periphery edge of the magnetic transfer carrier 2 is cleaned across a length of 10 mm×2=20 mm in one cycle of the cleaning tool 108. Therefore, since cleaning is performed in a region equal to or longer than 15.6 mm across which the magnetic transfer carrier 2 moves, all of the surface of the magnetic transfer carrier 2 is certainly put into contact with the cleaning tool 108 while the magnetic transfer carrier 2 rotates one time.

That is, if a radius of the cleaning tool is r (mm), a sliding repetition cycle in a case where the cleaning tool slides under control of the sliding section is t (s), a radius of the magnetic transfer 2 having the shape of almost a circle is R (mm) and a rotation speed of the magnetic transfer carrier 2 is x (rps) by definition, the relation of the following expression is preferably established:

$$\pi t \times R < r \Lambda \qquad (1)$$

Since a moving speed of the cleaning tool 108 is sufficiently faster compared with a rotation speed of the magnetic transfer carrier 2, the cleaning tool 108 can be certainly slid toward the outer periphery of the magnetic transfer carrier 2 from the inner periphery thereof almost along the radial shape of the recesses 4 on the magnetic transfer carrier 2.

Foreign matter attached in the recesses 4 can be certainly sent out to the outer periphery side by providing a construction in which the recesses 4 are formed in a radial shape extending toward the outer periphery of the magnetic transfer carrier 2 from the inner periphery thereof on the surface thereof with the outer periphery edge in an open state outside thereof, and the cleaning tool 108 can slide along the radial shape of the recesses 4 on the magnetic transfer carrier 2 toward the outer periphery thereof from the inner periphery thereof. That is, foreign matter attached in the recesses 4 is separated from the magnetic transfer carrier 2 by the contact with the magnetic transfer carrier 2 of the cleaning tool 108 and the rotation movement of the cleaning tool 108 itself and sent out to the outer side of the magnetic transfer carrier 2 through the recesses 4 formed in the radial shape.

Since the position indicated by the arrow mark FF of the cleaning tool 108 where the cleaning tool 108 is spaced apart away from the magnetic transfer carrier 2 is set to a position where the cleaning tool 108 is in no contact with the magnetic transfer carrier 2, that is a position where perfectly no contact portion exists between the cleaning tool 108 and the magnetic transfer carrier 2, foreign matter attached to the surface of the magnetic transfer carrier 2 can be certainly sent to outside of the magnetic transfer carrier 2.

At this time, as shown in this embodiment, a width of a recess 4 is preferably increased toward the outer periphery. This is because, with such a shape, foreign matter is easy to be sent out to the outside in company with sliding of the cleaning tool 108 toward the periphery from the inner periphery.

In addition, as shown in this embodiment, a press-down quantity of the cleaning tool 108 is preferably set to a value 10 times depth of a recess 4 or more. This is because if the press-down quantity is excessively small, an effect of removing foreign matter at the periphery edge of each of the recesses 4 is lost.

For example, observation with a microscope was performed in order to confirm a relationship between a press-down quantity of the cleaning tool 108 and the presence/absence of foreign matter in the recesses 4 after cleaning the magnetic transfer carrier 2 by adjusting the micrometer 113. As a result, it was confirmed that with a press-down quantity of 0.05 mm or more in a case of a depth of a recess 4 was 5 μm, foreign matter in the recesses 4 was certainly removed.

As described above, it has been made clear through the experiments that foreign matter in the recesses 4 is certainly removed by setting a press-down quantity of the cleaning tool 108 to a value 10 times or more a depth of a recess 4.

Figure 17:
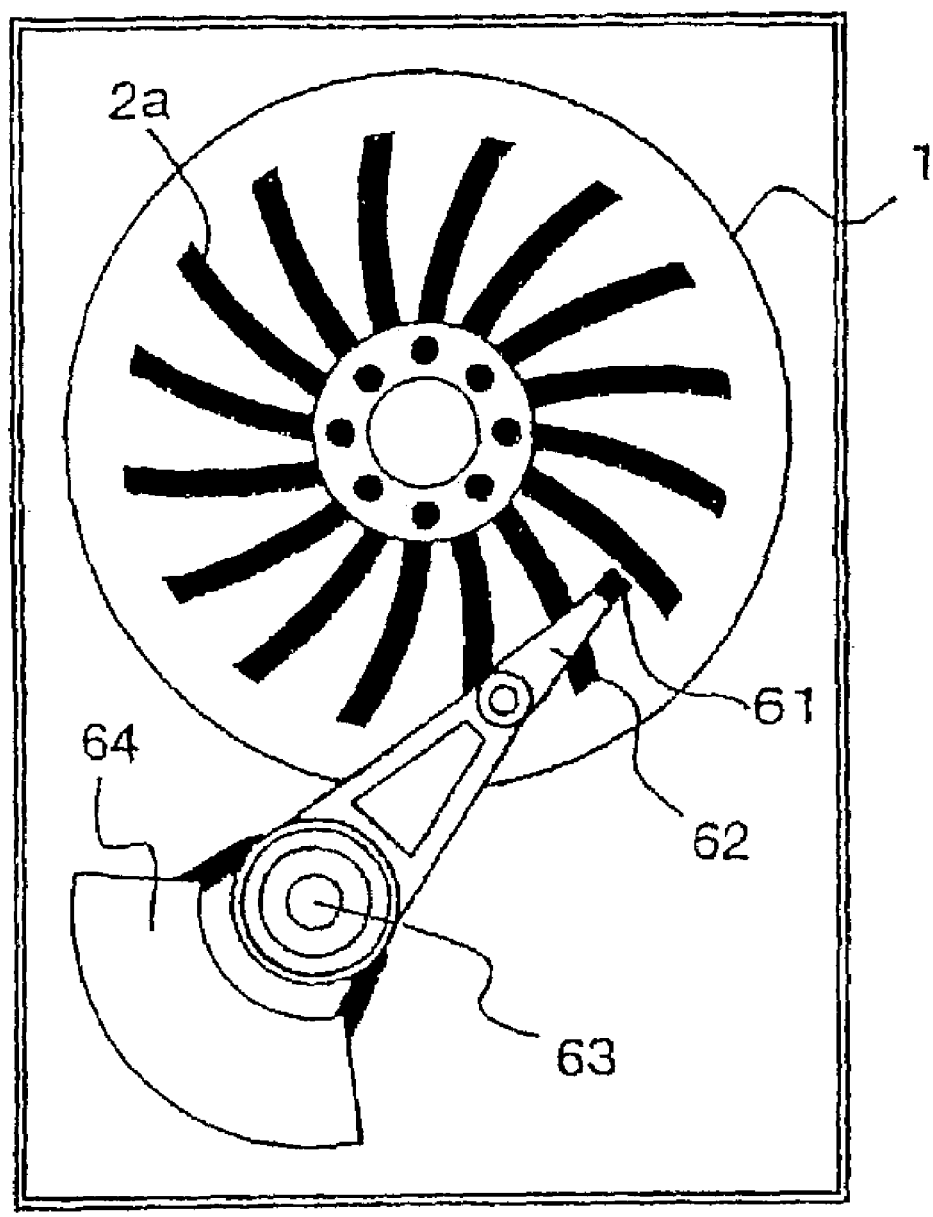
FIG. 17 is a plan view of a magnetic record reproducing apparatus according to another embodiment of the present invention.

Then, description will be given of a magnetic record reproducing apparatus with reference to FIG. 17. FIG. 17 is a view of a hard disk apparatus in a case where the magnetic disk 1 after magnetic transfer is performed using the magnetic transfer carrier 2 having been cleaned is installed in the hard disk apparatus.

In FIG. 17, a reference numeral 1 indicates a magnetic disk after magnetic transfer. Recording is performed onto the magnetic disk 1 by magnetically transferring information in the signal region 2a on the magnetic transfer carrier 2.

While a magnetic head 61 is scanned over the magnetic disk 1, the magnetic head 61 mounted on a head suspension 62 moves along a circular arc with a rotation axis 63 of a head actuator as the center thereof, which movement coincides with a circular arc of the signal region 2a. The magnetic disk 1 rotates at a rotation speed of 5400 rpm in the counterclockwise direction as viewed from above by a spindle motor (not shown) and the magnetic head 61 is pivotable by a voice coil motor 64 in a floating state 20 nm above the magnetic disk 1.

In the hard disk apparatus mounted with the magnetic disk 1 after magnetic transfer, record reproduction was performed with the magnetic head 1 to test a data error percentage. As a result of the test, it was found that a magnetic disk after magnetic transfer was performed using a magnetic transfer carrier cleaned by the method shown in this embodiment had almost the same data error percentage as a magnetic disk on which magnetic transfer was not performed. Therefore, it is thought that cleaning was realized by which no foreign matter remained on the surface of the magnetic transfer carrier 2 and no foreign matter remained in the recesses 4 either.

According to this embodiment, as described above, a surface of a magnetic transfer carrier and recesses thereon can be cleaned by a simple method with certainty. Therefore, a high reliability magnetic record reproducing apparatus can be realized.

Note that while as a liquid for cleaning, pure water is used, no specific limitation is imposed to this, but other liquid such as IPA (isopropyl alcohol), for example, can be used with an equivalent effect.

INDUSTRIAL APPLICABILITY

According to the present invention, application can be made to a cleaning method for a magnetic transfer carrier for use in magnetic transfer to a magnetic record medium used in a hard disk apparatus and a floppy disk apparatus.

The invention claimed is:

1. A cleaning method comprising:
   a first step of placing a dummy carrier having at least one recess thereon, said recess opening toward an outer periphery thereof from an inner periphery thereof on a rotary stage used for placing a magnetic transfer carrier thereon, said magnetic transfer carrier having plural radial recesses thereon each opening toward an outer periphery thereof from an inner periphery thereof; and
   a second step of sliding a cleaning tool for cleaning said magnetic transfer carrier on said dummy carrier toward said outer periphery thereof from said inner periphery thereof while rotating said dummy carrier with said rotary stage in rotation.

2. The cleaning method according to claim 1, wherein in said second step, said cleaning tool is slid on said dummy carrier toward the outer periphery thereof from the inner periphery thereof while rotating in substantially the same direction as in cleaning of said magnetic transfer carrier.

3. The cleaning method according to claim 1, wherein said dummy carrier has plural radial recesses thereon each with substantially the same shape as that of each of said plural radial recesses on said magnetic transfer camer.

4. The cleaning method according to claim 1, wherein in said second step, a contact press force of said cleaning tool to said dummy carrier when said cleaning tool is slid on said dummy carrier in cleaning is substantially the same as a contact press force of said cleaning tool to said magnetic transfer carrier when said cleaning tool is relatively slid on said magnetic transfer carrier in cleaning.

5. The cleaning method according to claim 1, wherein in said second step, a relative speed of said cleaning tool to said dummy carrier when said cleaning tool is slid on said dummy carrier in cleaning is substantially the same as a relative speed of said cleaning tool to said magnetic transfer carrier when said cleaning tool is relatively slid on said magnetic transfer carrier in cleaning.

6. The cleaning method according to claim 1, wherein in said cleaning, said cleaning tool is relatively moved as far as outside of said outer periphery edge of said dummy carrier.

7. The cleaning method according to claim 1, wherein said cleaning tool is a rotary brush made of polyurethane.

8. A cleaning method comprising:
   a first step of sliding a cleaning tool relatively on a dummy carrier thereon having at least one recess opening toward an outer periphery thereof from an inner periphery thereof to clean said cleaning tool; and
   a second step of, after said first step, sliding said cleaning tool relatively on a magnetic transfer carrier having plural recesses thereon each opening toward an outer periphery thereof from an inner periphery thereof in a state where said magnetic transfer carrier is held, to clean said magnetic transfer carrier.

9. The cleaning method according to claim 8, wherein a shape of said recess of said dummy carrier and a shape of said recess of said magnetic transfer carrier are substantially the same as each other.

10. The cleaning method according to claim 8, wherein a contact press force of said cleaning tool to said dummy carrier when said cleaning tool is slid on said dummy carrier in cleaning is substantially the same as a contact press force of said cleaning tool to said magnetic transfer carrier when said cleaning tool is relatively slid on said magnetic transfer carrier in cleaning.

11. The cleaning method according to claim 8, wherein a relative speed of said cleaning tool to said dummy carrier when said cleaning tool is slid on said dummy carrier in cleaning is substantially the same as a relative speed of said cleaning tool to said magnetic transfer carrier when said cleaning tool is relatively slid on said magnetic transfer carrier in cleaning.

12. The cleaning method according to claim 8, wherein in said first step, a cleaning liquid is jetted in a direction of said cleaning tool.

13. The cleaning method according to claim 12, wherein foreign matter in said cleaning liquid is measured, and according to a result of said measurement, cleaning with said cleaning tool is performed.

14. The cleaning method according to claim 8, wherein said cleaning tool is relatively moved as far as outside of said outer periphery edge of said dummy carrier.

15. The cleaning method according to claim 8, wherein said cleaning tool is relatively moved as far as outside of said outer periphery edge of said magnetic transfer carrier.

16. A cleaning apparatus comprising:
   a first carrier to be cleaned, said first carrier is in the shape of a disk;
   a second carrier utilized as a dummy carrier in the shape of a disk;
   a holding section for holding said first carrier and for holding said a second carrier;
   a cleaning tool disposed facing each of said both carriers held by said holding section; and
   a sliding section sliding said cleaning tool relatively on each of said both carriers in cleaning,
   wherein said sliding section slides said cleaning tool on said second carrier relatively thereto in a state where said second carrier is held by said holding section to clean said cleaning tool; and
   wherein the sliding section slides said cleaning tool on said first carrier relatively thereto in a state where said first carrier is held by said holding section to clean said first carrier.

17. The cleaning apparatus according to claim 16, wherein
   in cleaning, said cleaning tool is relatively moved as far as outside of said outer periphery edge of said second carrier.

18. The cleaning apparatus according to claim 16, wherein
   in cleaning, said cleaning tool is relatively moved as far as outside of said outer periphery edge of said first carrier.

19. The cleaning apparatus according to claim 16, wherein
   a carrier is used, as said first carrier, on which an information signal is recorded, and which is used in magnetic transfer of said information signal onto a magnetic record medium in contact therewith, and having a recess for close contact between said first carrier and said second carrier in magnetic transfer, on a magnetic transfer surface of said carrier facing said magnetic record medium, in which said recess has a shape to open toward an outer periphery of said carrier from an inner periphery thereof and in addition, serves as a recess for cleaning, and a carrier is used, as said second carrier, on which a recess with almost the same shape as that of said recess on said first carrier, on at least one carrier surface thereof.

* * * * *